(12) United States Patent
Sands et al.

(10) Patent No.: US 8,780,686 B2
(45) Date of Patent: Jul. 15, 2014

(54) REDUCED MEMORY VECTORED DSL

(76) Inventors: Nicholas P. Sands, Menlo Park, CA (US); Stephanie F. Pereira, Santa Clara, CA (US); Darren B. Hutchinson, San Jose, CA (US); Kevin D. Fisher, Palo Alto, CA (US); Amitkumar Mahadevan, Freehold, NJ (US)

( * ) Notice: Subject to any disclaimer, the term of this patent is extended or adjusted under 35 U.S.C. 154(b) by 326 days.

(21) Appl. No.: 13/189,095

(22) Filed: Jul. 22, 2011

(65) Prior Publication Data

US 2012/0020418 A1   Jan. 26, 2012

Related U.S. Application Data

(60) Provisional application No. 61/366,585, filed on Jul. 22, 2010, provisional application No. 61/371,950, filed on Aug. 9, 2010.

(51) Int. Cl.
*H04J 1/12* (2006.01)
*H04B 3/20* (2006.01)

(52) U.S. Cl.
USPC .......................................... 370/201; 370/289

(58) Field of Classification Search
CPC ..................................... H04J 1/12; H04B 3/23
USPC ................................................ 370/201, 289
See application file for complete search history.

(56) References Cited

U.S. PATENT DOCUMENTS

| | | | |
|---|---|---|---|
| 6,724,849 B1 | 4/2004 | Long et al. | |
| 7,843,949 B2 | 11/2010 | Xu | |
| 2003/0086514 A1* | 5/2003 | Ginis et al. | 375/346 |
| 2005/0195892 A1 | 9/2005 | Ginis et al. | |
| 2005/0259725 A1 | 11/2005 | Cioffi | |
| 2006/0280235 A1* | 12/2006 | Rhee et al. | 375/222 |
| 2007/0263711 A1* | 11/2007 | Kramer et al. | 375/222 |
| 2008/0068978 A1 | 3/2008 | Clausen | |
| 2008/0071516 A1 | 3/2008 | Cioffi et al. | |
| 2008/0160915 A1 | 7/2008 | Sommer et al. | |
| 2009/0086798 A1* | 4/2009 | Zukunft et al. | 375/222 |
| 2009/0207985 A1* | 8/2009 | Cioffi et al. | 379/93.01 |

FOREIGN PATENT DOCUMENTS

| | | | |
|---|---|---|---|
| WO | WO2010/022908 A2 | 1/2010 | |
| WO | WO2010/002908 A2 | 2/2010 | |
| WO | WO2010/002908 A2 | 7/2010 | |

OTHER PUBLICATIONS

Cendrillon, R., et al., "Partial crosstalk precompensation in downstream VDSL," Signal Processing vol. 84, pp. 2005-2019 (2004).

(Continued)

*Primary Examiner* — Mark Rinehart
*Assistant Examiner* — Angel Brockman
(74) *Attorney, Agent, or Firm* — Pillsbury Winthrop Shaw Pittman LLP

(57) ABSTRACT

The memory storage, transmission and processing demands of a vectored DSL system are reduced by sampling a subset of DSL tones in the DSL tone range used in the vectored system. This data is smoothed (denoised) to further reduce the data's size, sacrificing some fidelity or precision as a result. Finally, lossless entropy coding or the like is performed to encode the FEXT cancellation data for storage and use. The resulting data is less likely to cause transmission bottlenecks in the vectored system, can be stored and used more efficiently for both on-chip and off-chip vectoring implementations, and can be readily updated in various ways.

19 Claims, 29 Drawing Sheets

(56) References Cited

OTHER PUBLICATIONS

Ginis G., et al., "Vectored Transmission for Digital Subscriber Line Systems," IEEE JASC special issue on twisted-pair transmission, vol. 20, Issue 5, pp. 1085-1104, Jun. 2002.

Ginis G., et al., "Vectored-DMT: A FEXT Canceling Modulation Scheme for Coordinating Users," Proceedings of IEEE ICC 2001, vol. 1, pp. 305-309, Jun. 2001, Helsinki, Finland.

Rissanen, J.J., et al., "Arithmetic coding," IBM Journal of Research and Development, vol. 23, No. 2, Mar. 1979.

Witten, I.A., et al., "Arithmetic Coding for Data Compression," Communications of the ACM, vol. 30, No. 6, pp. 520-540, Jun. 1987.

Huffman, D.A., "A Method for the Construction of Minimum-Redundancy Codes," Proceedings of the I.R.E., pp. 1098-1102, Sep. 1952.

Golomb, S. "Run-length encodings," IEEE Transactions on Information Theory, vol. 12, No. 3, pp. 399-401, 1966.

International Search Report and Written Opinion for PCT/US2009/049283 issued Feb. 4, 2010.

International Search Report and Written Opinion for PCT/US2011/045027 Issued Apr. 6, 2012.

\* cited by examiner

Figure 4

| Sub-Field Names | Sub-Field Length (bits) | Parameter Description | Field Length (bits) | Field Name |
|---|---|---|---|---|
| Ports In Packet | 16 | 16-bit map of ports included in packet. LSB=port 0 | 16 | Ports in Packet |
| Superframe Index | 15 | this allows pilot sequence lengths up to 1024. Index resets to zero at start of Pilot Symbol Sequence. | 24 | Index |
| Symbol Index | 9 | 0:255=data frames, 256= sync frame, 257-511 undefined | | |
| Band StartBin Index | 16 | first tone of band | | Bin Range |
| Band StopBin Index | 16 | last tone of band | 32 | |
| Port 0 Data | 2*b | b=configured FFT/IFFT data precision, port 0 first | | |
| Port 1 Data | 2*b | | 2*N*b | StartBin Payload |
| ... | ... | | | |
| Port N-1 Data | 2*b | | | |
| Port 0 Data | 2*b | b=configured FFT/IFFT data precision | | |
| Port 1 Data | 2*b | | 2*N*b | StartBin+1 Payload |
| ... | ... | | | |
| Port N-1 Data | 2*b | | | |
| ... | ... | ... | ... | ... |
| Port 0 Data | 2*b | b=configured FFT/IFFT data precision | | |
| Port 1 Data | 2*b | | 2*N*b | StopBin Payload |
| ... | ... | | | |
| Port N-1 Data | 2*b | | | |
| CRC | 16 | Not required if included in Serdes protocol. Can pad Payload to make entire payload 16 bit multiple. | 16 | CRC |

```
function y = encode(x, M, mode);
%
% default mode for binary coding is littleEndian,
% for big-endian, call with a third (arbitrary) parameter
%
if nargin < 3, littleEndian = 1; else littleEndian = 0; end % have to map the negative numbers (put this into the encoder)
x(find(x>=0)) = 2*x(find(x>=0));
x(find(x<0)) = -2*x(find(x<0)) -1;

% maxCodeWordLength = log2(M) + floor(max(x)/M)

y = [];
while length(x)>0, q = floor( x(1) / M);   % bitshift(x(1), -M)
    for i = [0:q-1],
        y = [y, 1]; %  write q ones in unary code
    end
    y = [y, 0]; % terminator for the unary codeword % this part adds the remainder coded as binary in log2(M) bits
    if littleEndian,
        v = 1;
        for i = [0:log2(M)-1],
            y = [y, (bitand(v , x(1))>0) ];   %want bitwise AND
            v = 2*v;           % bitshift(v, 1);
        end
    else
        %for big-endian
        v = M/2;
        for i =[0:log2(M)-1],
            y = [y, (bitand(v, x(1))>0)];
            v = v/2;
        end
    end x = x(2:length(x));
end
```

Figure 31

REDUCED MEMORY VECTORED DSL

PRIORITY CLAIM AND CROSS-REFERENCE TO RELATED APPLICATIONS

This application claims priority to and the benefit of the following prior filed co-pending applications:

U.S. Ser. No. 61/366,585 filed Jul. 22, 2010, entitled A METHOD AND APPARATUS FOR ECONOMIZING ON THE MEMORY REQUIREMENTS FOR VECTORED DSL, the entire disclosure of which is incorporated herein by reference in its entirety for all purposes;

U.S. Ser. No. 61/371,950 filed Aug. 9, 2010, entitled A METHOD FOR COMPRESSING COMPLEX OR MULTI-DIMENSIONAL SEQUENCES, the entire disclosure of which is incorporated herein by reference in its entirety for all purposes;

TECHNICAL FIELD

The present invention relates generally to the field of vectored DSL communication systems.

BACKGROUND

Digital Subscriber Line (DSL) communications suffer from various forms of interference, including crosstalk. Various techniques have been developed to combat this interference and its effects on data transmission, including vectored DSL. The amount of vectoring-related data that must be transmitted between downstream and upstream modems is substantial for vectored DSL systems; vectoring data relating to crosstalk also must be stored, updated, manipulated and/or processed by upstream devices such as vectoring control entities and/or other vectoring modules.

Vectoring mitigates crosstalk inherent in twisted-pair DSL networks by cancelling or pre-cancelling crosstalk interference in the signals of a vectored group of co-located transceivers. The crosstalk from and into every transceiver is described as a matrix (channel matrix) for every tone (frequency) used by the individual transceivers. To perform cancellation, the vector processing system must have access to the signals from and to each transceiver participating in a vectored group, and cancellation information is embodied in coefficients that describe the inverse (or approximate inverse) of the channel matrix. Because the number of coefficients increases as the square of the number of DSL lines in a vectored group, and because earlier systems have stored coefficients for each unit and frequency as fixed size numbers, memory requirements in vectored systems increase rapidly with larger vectored groups. Partial cancellation techniques have included line selection (retaining coefficients for only the dominant disturber DSL lines) and tone selection (retaining coefficients for only the dominant disturbing tones), but both of these methods require supervision (e.g., supervising software, firmware) to monitor tones and/or lines being cancelled. Since network characteristics and operating conditions change over time, these monitoring functions must be maintained as the conditions change. Systems, methods, apparatus, etc. that reduce vectoring data storage, transfer and processing demands in vectored DSL systems would represent a significant advancement in the art.

SUMMARY

Far-end crosstalk (FEXT) channels for victim-disturber DSL pairs are correlated in the frequency domain—that is, FEXT coupling for victim-disturber pairs is smooth and decimation can embody the coupling function with fewer coefficients (albeit with some information loss) than systems that collect coupling information for every tone. Prediction can be used to extract the correlation (e.g., via a linear predictor filter) and then develop an error signal between the decimated and predicted channel estimates. With a good predictor, the error variance is smaller than the variance of the coupling function, so error signals are stored instead the coefficients of the coupling functions themselves. Because of the variability of the coupling functions over the frequency domain and from line to line, many error samples are too small to be significant and can be discarded and replaced with zero. The resulting non-uniform symbol usage distribution in the sequences of error samples (e.g., zero is more frequent than any other number, small numbers are much more frequent than large ones, etc.) allows lossless entropy coding (arithmetic coding, Huffman, Golomb, Golomb-Rice, etc.) to be used to compress sequences, further reducing memory size.

Various combinations of processing reduce the size needed to store the coefficients to meet overall system performance objectives. Noise reduction (e.g., smoothing) can be applied to channel estimates based on measurements that are limited in time and made in the presence of noise. Such noise reduction is based on the knowledge that the FEXT channels for any victim-disturber pair are correlated in the frequency domain. The correlation in the frequency domain of individual coupling functions can be exploited using decimation, sampling, prediction, etc. Variable quantization based on a performance-weighted noise (or error variance) criterion can be applied (e.g., quantization with a step size that varies according to tone frequency or band). Coding (e.g., lossless compression) also can be applied to remove redundancy. Due to required high speed vectoring computation, some embodiments can be implemented in hardware digital signal processing circuitry (e.g., application-specific integrated circuit (ASIC), field programmable gate array (FPGA), and/or other devices).

By contrast with previous crosstalk partial cancellation using tone selection and/or line selection, embodiments of generalized partial DSL cancellation disclosed and claimed herein advantageously reduce memory and bandwidth demands while largely eliminating the overhead required to supervise and control the selection. These embodiments make practical the implementation of a 64-port vectoring system in a single FPGA, and extension to larger systems with reasonable complexity (i.e., number of chips, cost, board area, etc.). Any vectoring system handling more than a few ports runs into one or both of the problems of memory size (e.g., in an FPGA) and/or memory bandwidth (e.g., for off-chip access). Moreover, embodiments herein provide equal or greater reductions in memory and bandwidth requirements while requiring no explicit monitoring or supervision of which specific lines or tones are being cancelled as required in earlier tone selection and line selection partial cancellation schemes.

BRIEF DESCRIPTION OF DRAWINGS

The present invention will be readily understood by the following detailed description in conjunction with the accompanying drawings, wherein like reference numerals designate like structural elements, and in which:

FIG. 4 is an example of a packet structure according to one or more embodiments of the present invention.

FIGS. 30 and 31 illustrate one or more apparatus and/or method embodiments of reduced-memory vectored DSL showing FEXT data and/or coefficient Golomb encoding.

DETAILED DESCRIPTION

Figure 1:
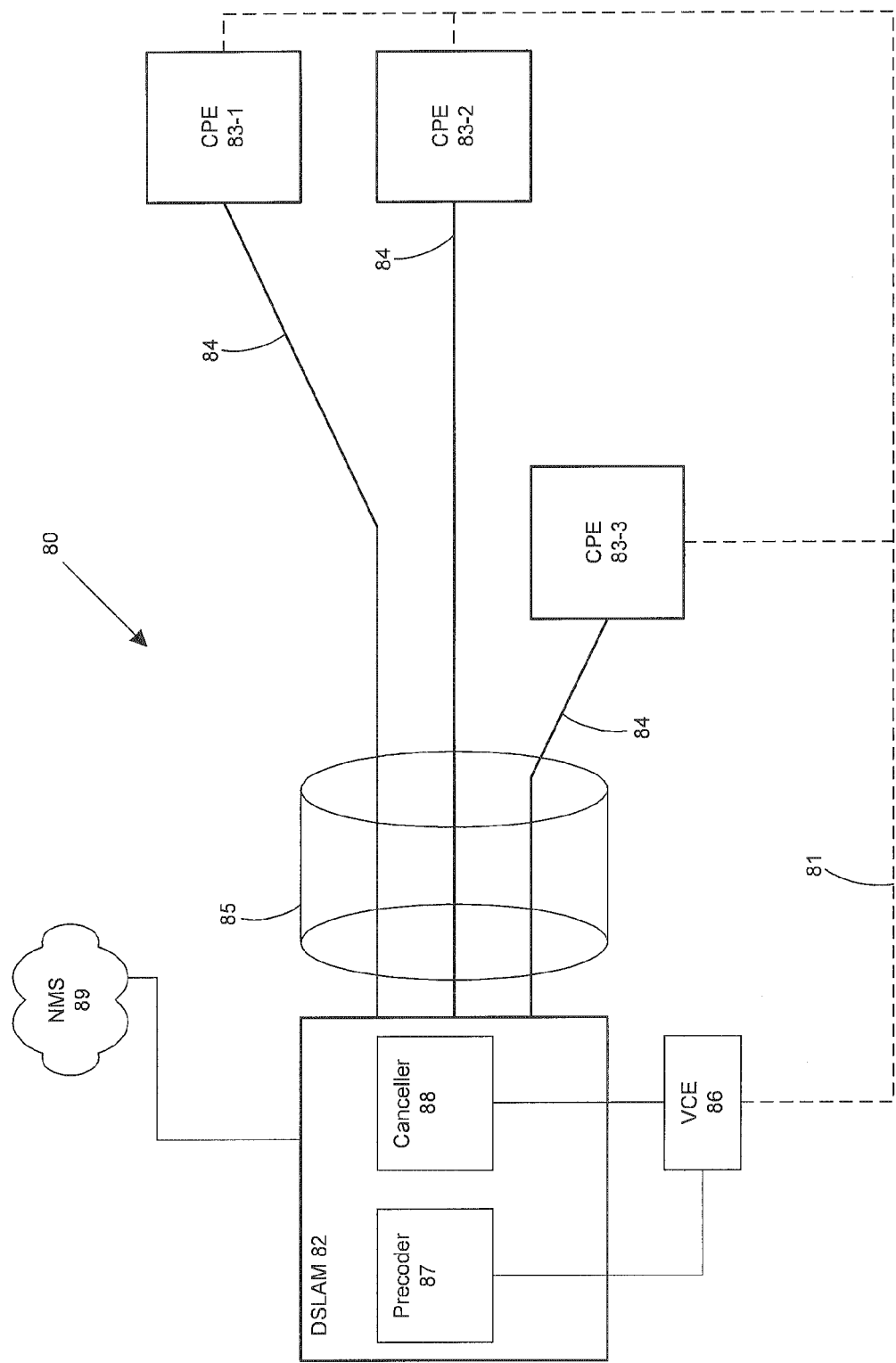
FIG. 1 is a (MIMO) DSL system in which embodiments of the present invention can be implemented.

The following detailed description will refer to one or more embodiments, but the present invention is not limited to such embodiments. Rather, the detailed description and any embodiment(s) presented are intended only to be illustrative and to cover all alternatives, modifications, equivalents, etc. included within the spirit and scope of the disclosure as defined by the appended claims. Those skilled in the art will readily appreciate that the detailed description given herein with respect to the Figures is provided for explanatory purposes as the invention extends beyond these limited embodiments.

Certain terms are used throughout the description and claims to refer to particular system components. As one skilled in the art will appreciate, components may be referred to in the art by different names. This disclosure does not intend to distinguish between components that differ insubstantially. Phrases such as "coupled to" and "connected to" and the like are used herein to describe a connection between two devices, elements and/or components and are intended to mean physically and/or electrically either coupled directly together, or coupled indirectly together, for example via one or more intervening elements or components or via a wireless connection, where appropriate. The terms "chip" and "processor" refer broadly to hardware devices that operate in a prescribed manner, for example to process data, and can include various types of such devices (for example, a field-programmable gate array (FPGA), a digital signal processing (DSP) chip, an application-specific integrated circuit (ASIC), an integrated circuit (IC), etc., as well as more complex devices or combinations of such devices such as computers). The term "system" refers broadly to a collection of two or more components and may be used to refer to an overall system (e.g., a computer and/or communication system or a network comprising one or more computers, communication components, etc.), a subsystem provided as part of a larger system (e.g., a subsystem within an individual computer), and/or a process or method pertaining to operation of such a system or subsystem. In this specification and the appended claims, the singular forms "a," "an," and "the" include plurals unless the context clearly dictates otherwise. Unless defined otherwise, technical and scientific terms used herein have the same meanings that are not inconsistent to one of ordinary skill in the art relevant subject matter disclosed and discussed herein.

Reference in the specification to "some embodiments," "one embodiment," "an embodiment," etc. of the present invention means that a particular feature, structure or characteristic described in connection with such embodiment(s) is included in at least one embodiment of the present invention. Thus, the appearances of the noted phrases and the like in the specification are not necessarily all referring to the same embodiment.

In the absence of crosstalk, the existing copper telephone infrastructure can in theory be utilized to carry from tens to hundreds of megabits per second over distances up to approximately 5,000 feet using discrete multitone (DMT) digital subscriber line (DSL) modem technology. DMT modems divide the available bandwidth into many sub-carriers (also referred to as "tones," "frequencies" and/or "bins") that are synchronized and independently modulated with digital QAM data to form an aggregate communication channel between the network and subscriber. DMT-based DSL systems typically use Frequency Division Multiplexing (FDM) and assign particular sub-carriers to either downstream (that is, from DSLAM/CO to CPE/user) or upstream (from CPE/user to DSLAM/CO) directions. This FDM strategy limits near end crosstalk (NEXT). DMT systems are typically very robust in the presence of radio frequency interference (RFI) and other types of frequency-selective noise (or interference) or channel dispersion, because each sub-carrier can be independently modulated with an appropriate amount of data and power in order to meet the system requirements and the desired bit error rate.

Typical telephone binder cables typically contain between 10 and 50 unshielded copper twisted pairs (these binders are then bundled into larger cables). Due to variations in manufacturing and imperfect cable installation (for example, bending, etc.), significant levels of FEXT occur between each twisted pair within a binder (and between adjacent binders), as is well known to those skilled in the art. As a result of typical cable construction, installation and deployment techniques, each twisted pair is physically adjacent to many other twisted pairs in (or outside) its binder for a significant distance in the cable. While there is variation in the FEXT levels as a result of manufacturing variation, the net result is that every copper pair imparts some amount of FEXT onto virtually every other copper pair in the cable. In many instances, the FEXT can be as much as or more than 40 dB higher than the background noise level on the line and the crosstalk typically increases with frequency. Cable measurements have shown that each particular line has at least, and often more than, 5 to 10 disturbers that impact the line's performance. As a result, FEXT is the dominant impairment in reaching high data rates in DMT DSL systems on relatively short loops.

Also, the following publications are incorporated by reference in their entireties for all purposes: WIPO Publication No. WO 2010/002908 A2, entitled "Reduced Memory Vectored DSL" and published on 7 Jan. 2010; R. Cendrillon et al. "Partial crosstalk precompensation in downstream VDSL," Signal Processing vol. 84, pp. 2005-2019 (2004).

As a result of typical cable construction, installation and deployment techniques, FEXT is the dominant impairment in reaching high data rates in DMT DSL systems on many loops. Advanced signal processing "vectoring" partially or completely cancels FEXT between twisted pairs within copper telephone cables and permit dramatically higher data rates. Vectoring is explained in more detail in "Vectored Transmission for Digital Subscriber Line Systems," by G. Ginis and J. Cioffi (IEEE JSAC special issue on twisted-pair transmission, Vol. 20, Issue 5, pp. 1085-1104, June 2002); and "Vectored-DMT: A FEXT Canceling Modulation Scheme for Coordinating Users," by G. Ginis and J. Cioffi (Proceedings of IEEE ICC 2001, Vol. 1, Helsinki, Finland, pp. 305-09, June 2001), both of which are incorporated by reference herein for all purposes.

Vectoring coordinates communications between DSL lines in a telephone cable, which all terminate in a central location known as a DSLAM (DSL access multiplexer). To vector DSL modems effectively, they must be synchronized to the same DMT symbol clock and have synchronized training/tracking periods with pre-arranged training data patterns (unique to each modem) to allow victim modems to identify crosstalk characteristics between particular pairs of disturber-victim modems. As will be appreciated by those skilled in the art, there are a variety of techniques for identifying crosstalk in such systems, including one or more that may be described in various applicable standards pertaining to DSL systems and their implementation. "Crosstalk topography" or mapping typically is expressed as a matrix of the various interactive/crosstalking relationships between DSL lines determined during training, tracking and the like. Precompensation (e.g., precoding) is used in the downstream direction (e.g., from a DSLAM to a customer site), pre-distorts a modem's transmit waveform using other modems' transmit waveforms (i.e., modems whose FEXT affects the given modem's signals), such that interfering FEXT is counteracted and its effects eliminated or reduced when the pre-distorted modem signal reaches its customer side modem. In the upstream direction (e.g., from customer site to DSLAM), MIMO (multiple-input-multiple-output) spatial filtering at the DSLAM cancels upstream FEXT at the upstream receive side. Cancellation coefficients can be identified and updated using LMS (Least Mean Squares) adaptive algorithms or other Least-Squares type methods, as is well known.

Embodiments of reduced memory DSL disclosed and claimed herein utilize techniques and apparatus to reduce "vectoring data" (or "FEXT data" or the like) storage, transfer and processing demands in vectored DSL systems (e.g., storing, transmitting and/or processing received error signals or other signals that are proxies for FEXT on a given DSL line, FEXT compensation filter coefficients, FEXT channel estimates or coefficients, a FEXT compensation matrix G, back-channel communication signals conveying such information, etc.). FEXT coupling information is derived from DSL modems' measurements during initialization and training. In some embodiments described herein FEXT coupling is estimated for only a subset of tones and FEXT is then canceled for all used tones by reconstructing, estimating, etc. coefficients. Some embodiments involve information loss, resulting in a discrepancy between ideal and reconstructed coefficients; such reconstruction error appears as uncanceled or residual FEXT and combines with background noise in a receiver. Bit allocation (typically limited to 15 bits/tone) limits the Signal-to-Noise Ratio (SNR) needed to support reliable communication. Also, unavoidable signal attenuation in twisted pairs increases with frequency, so the allowable residual FEXT level (i.e., the amount of FEXT that causes minor enough degradation that no benefit is gained by further residual FEXT suppression) varies with tone frequency. Use of quantization in embodiments herein thus varies as a function of tone frequency; the set of quantization intervals being derived in some embodiments by examining overall data rate objectives for the complete vectored DSL system.

For a given victim/disturber pair, FEXT coupling is strongly correlated over frequency. This correlation can be embodied as a linear prediction filter, so FEXT coupling information at some frequencies is used to predict coupling at other frequencies. If the prediction error is computed, the variance of this prediction error is small compared to the variance of the FEXT coupling itself, so FEXT coupling information at a starting tone, used with the prediction error sequence over a large set of tones, is sufficient to capture the FEXT coupling for a large set of tones. Memory storage, transmission and processing demands required for such information is therefore less than that for the FEXT coupling for the set of tones. To reconstruct the FEXT cancellation coefficients at every tone in such embodiments, the error sequence is processed with the inverse of the linear prediction filter, together with the starting state, for example in a prediction filter using the first order difference in which the coefficient value at the previous tone is subtracted from the value at the current tone. In other embodiments, a linear transform such as the Discrete Cosine Transform transforms the set of available estimates of the FEXT coupling. The strong correlation in the estimates of the FEXT coupling means that many values of the transformed estimates will be small and can be discarded with minimal loss in fidelity. An adjustable threshold can be used to select those transform values to be retained. Thus fewer quantities remain to store, transmit and process in vectored DSL systems. After one or more of the preceding approaches have been applied, the resulting sequence is composed of symbols (numbers) with non-uniform frequency of occurrence. Some embodiments then apply (lossless) variable-length entropy coding to further reduce memory storage, transmission and processing demands (e.g., arithmetic coding, Huffman coding and Golomb coding, which involve assigning symbols to codewords having lengths inversely proportional to the frequency of the symbols' occurrences—memory, bandwidth and/or processing advantages accrue because more frequent symbols are assigned to short codewords.

To be an effective FEXT canceller or precoder, coefficients should reflect the apparent state (as perceived by the modem) of the physical loop plant, which can vary with time. To accomplish this, channel measurements are made from time to time using special symbols, and additive updates to the coefficients are computed (updates are added to previous coefficients to create new coefficients for given disturber/victim pairs and tone frequencies). Because both the prediction filter and transform methods are linear, the prediction filter or transform is applied to the update to simplify implementation, after which the filtered or transformed update is added to the previous set of coefficients. The use of variable-length coding complicates the updating process, because the result of the update may have different storage requirements (e.g., the new set of coefficients may be too large to fit in available memory). To protect the system against overflow, embodiments of reduced memory vectored DSL herein can use adjustable parameters that control the fidelity and memory size to that the system starts with a parameter combination that guarantees the coefficients fit in available memory, and that subsequent iterations will refine the set of coefficients until a pre-determined limit is reached.

Embodiments of reduced-memory vectored DSL thus yield (1) a vectored DSL system having a reduced bandwidth burden for data transmissions from CPE side FEXT data collectors to DSLAMs, and/or (2) a vectored DSL system with reduced upstream-end data storage, transmission and processing requirements for FEXT cancellation data (e.g., for accessing FEXT data for processing within a DSLAM or the like).

A "full" FEXT cancellation scheme (cancelling all FEXT for all disturbers on all frequencies) for a vectored group having U users requires computations of the order $U^2$ per DMT symbol period. In a DSL system with nearly 4,096 tones and with only 10 vectored users, the complexity level for "full" FEXT cancellation is on the order of billions of flops per second and power dissipation in FEXT mitigation devices is proportional to the complexity of the FEXT mitigation algorithm. Those skilled in the art will appreciate that such a degree of complexity involved in any full FEXT cancellation is thus presently impractical. Moreover, perfect cancellation in such systems is unlikely due to imperfections in generating and updating cancellation coefficients and in processing techniques used in such systems. As such, partial FEXT cancellation schemes have been devised and implemented to provide reasonable use of available computational resources to perform FEXT cancellation and to enhance data rates.

Various methods, techniques, etc. have therefore been developed for performing "partial" upstream FEXT cancellation for a given vectored user. Some embodiments of partial FEXT cancellation rank system users based on coupling and input signal levels. In others FEXT cancellation comprises a selection phase during which a determination regarding each disturber is made based on whether or not to process each disturber's input, independent of other disturbers' contributions. In such embodiments, a threshold approach is used in the selection phase. Various factors determine the threshold and can include but are not limited to: average input signal energy level, amplitude of the coupling channel, and targeted level of residual FEXT after partial FEXT cancellation is performed. Various embodiments for partial FEXT cancellation result in power consumption reduction and allow multiplexing or sharing of computational resources. Other embodiments provide data bandwidth requirement reductions.

FIG. 1 illustrates an exemplary vectored group DSL system 80 (e.g., VDSL, VDSL2, ADSL, etc.) in which embodiments of reduced-memory vectored DSL can be implemented, system 80 comprising an upstream-end DSL device (e.g., CO side DSLAM 82) and a plurality of U downstream-end DSL devices (e.g., CPEs 83) coupled to DSLAM 82 via twisted pairs 84, which are bundled in binder 85. DSLAM 82 includes a crosstalk precoder 87 and a crosstalk canceller 88 coupled to lines 84. A vectoring control entity (VCE) 86 is coupled to precoder 87 and canceller 88, and coupled to CPEs 83 via one or more channels 81 (channels 81 between CPEs 83 and VCE 86 may be upstream logical data paths from CPEs 83 to DSLAM 82 and may not be physically separate from lines 84). Other configurations of the canceller 88, precoder 87 and VCE 86 are known and can be used in various embodiments. CPEs 83 transmit FEXT cancellation data (e.g., error signals, quantized data, etc.) via channels 81 to the DSLAM 82, which extracts and sends the error feedback signals to VCE 86. DSLAM 82 may optionally be coupled to a network management system (NMS) 89, that can be a network management structure that processes data exchanged with DSLAM 82. In other embodiments, DSLAM 82 can be modified to include splitters, filters, management entities, and various other hardware, software, and functionalities. DSLAM 82 comprises a plurality of DSL transceivers (e.g. VTU-Os) that exchange signals between the VCE 86, canceller 88, precoder 87, NMS 89, and/or lines 84. DSL signals are received and transmitted using the DSL transceivers, which can be modems, modem cards, line cards, etc. CPEs 83 each comprise a DSL transceiver (e.g. a VTU-R) to transmit data to DSLAM 82 via a line 84. A variety of other upstream-end and downstream-end configurations and DSL devices can be used and the exemplary configuration of FIG. 1 is not limiting, as will be appreciated by those skilled in the art.

Precoder 87 pre-cancels crosstalk in downstream DSL transmissions using partial crosstalk cancellation to reduce downstream signal crosstalk noise, e.g. using a typical DSL system band plan with a number of downstream and upstream bands that can be used with embodiments of reduced-memory vectored DSL herein. A MIMO system like FIG. 1 can be characterized by system (or channel) responses from each input to each output of the system. For linear systems, the system responses are linear functions. For example, inputs 1 through U and outputs 1 through U have system responses $H_{ij}$ (FEXT channel responses/coefficients for i≠j, and direct channel responses/coefficients for i=j), namely $H_{11}, H_{12}, \ldots, H_{1U}, H_{21}, \ldots, H_{U1}, H_{U2}, \ldots, H_{UU}$. Any given Output$_u$ is thus the aggregate response from every input (1 to U) to that output. To identify system responses, $H_{ij}$ with (i,j=1: U), inputs can be stimulated with test signal input data (e.g., pilot and/or orthogonal training or tracking sequences) and the test signal output data of the system received, observed, measured and/or collected by CPE modems (i.e., downstream-end DSL devices). Data received or computed by a receiving modem is typically an error signal. Each modem knows what the training/tracking data inputs are and what output signal the modem should receive if no crosstalk is present. The receiving modem calculates an error signal representative of the difference between the expected transmission output and the actual (FEXT-perturbed) transmission output. These error signals can be sent to a DSLAM or the like as an indication of a given DSL line's FEXT interference. The DSLAM collects these error signals from all of the relevant CPE modems and correlates the data to determine the $H_{ij}(k)$ coefficients that represent crosstalk effects in the relevant DSL lines.

Thus, each sub-channel becomes an independent MIMO system whose channel response can be independently (and simultaneously) identified. Direct system responses, $H_{ii}$, correspond to desired modem response signals for a single subchannel from each modem's own twisted pair and the remaining terms, $H_{ij}$, where $i \neq j$, correspond to FEXT from other lines in the same or a different cable. Such a system exists in both upstream and downstream directions where tone groups are assigned to either transmission direction. Various embodiments of reduced-memory vectored DSL are described herein in connection with a DSLAM coupled to a number of CPE modems. However, as appreciated by those skilled in the art, other embodiments can be used in other DSL transmission and vectoring settings and structures. For example, a DSL line may couple a DSLAM to an intermediate DSL line device such as an optical networking terminus (ONT), a signal repeater, etc. Likewise, the upstream end of a DSL line might terminate with a device or apparatus other than a DSLAM. That is, embodiments of the present invention can be used in a variety of DSL settings in which the DSL line terminates with a downstream transceiver and an upstream transceiver.

Previous DSLAM-side vectoring systems performed transmit pre-coding by each CPE modem measuring/collecting FEXT responses for all tones in the DMT system (based, e.g., on training data transmitted from a telco side device) and sent each tone's collected measurement to the telco/DSLAM side device (over a back-channel) for FEXT channel estimation and further processing. As is known to those skilled in the art, each value sent to the DSLAM by the CPE after crosstalk training can be a proxy for $H_{ij}$, rather than the value of $H_{ij}$ itself (such variations in commonly used and known notation or quantities is not discussed in detail). Alternatively, CPEs could perform needed FEXT channel estimation processing and send channel estimates to the telco/DSLAM side over the back-channel. Because FEXT channel characteristics can vary over time, these channel estimates typically are tracked and updated regularly over time. In vectored DSL systems, upstream back-channel communication of FEXT data can be a significant bottleneck and subsequent storage of FEXT data can be a substantial memory burden. Back-channel communication of FEXT channel measurements or the like is especially problematic, as only a low bit-rate control channel is available during this preliminary startup period (prior to full modem training and initialization). This communication bottleneck can slow system-training time and postpone useful system operation. Back-channel communication also is a problem during normal system operation, because most DSL frequency band schemes are biased in favor of higher downstream rates at the expense of lower upstream rates (e.g., by a 10:1 ratio). Thus back-channel communication may be a significant part of a total available upstream data rate. If sufficient bandwidth is not allocated for updating FEXT data measurements, updates may be slowed and prevent timely tracking of channel variation. Storage of the FEXT channel data is a related problem. Generally, a system with U users has $U^2$ total channel responses (U desired direct channel responses and $U*(U-1)$ FEXT channel responses) that are calculated and stored for each DMT tone. While some optimization techniques reduce the burden, storage requirements can still be very large and onerous.

Figure 2:
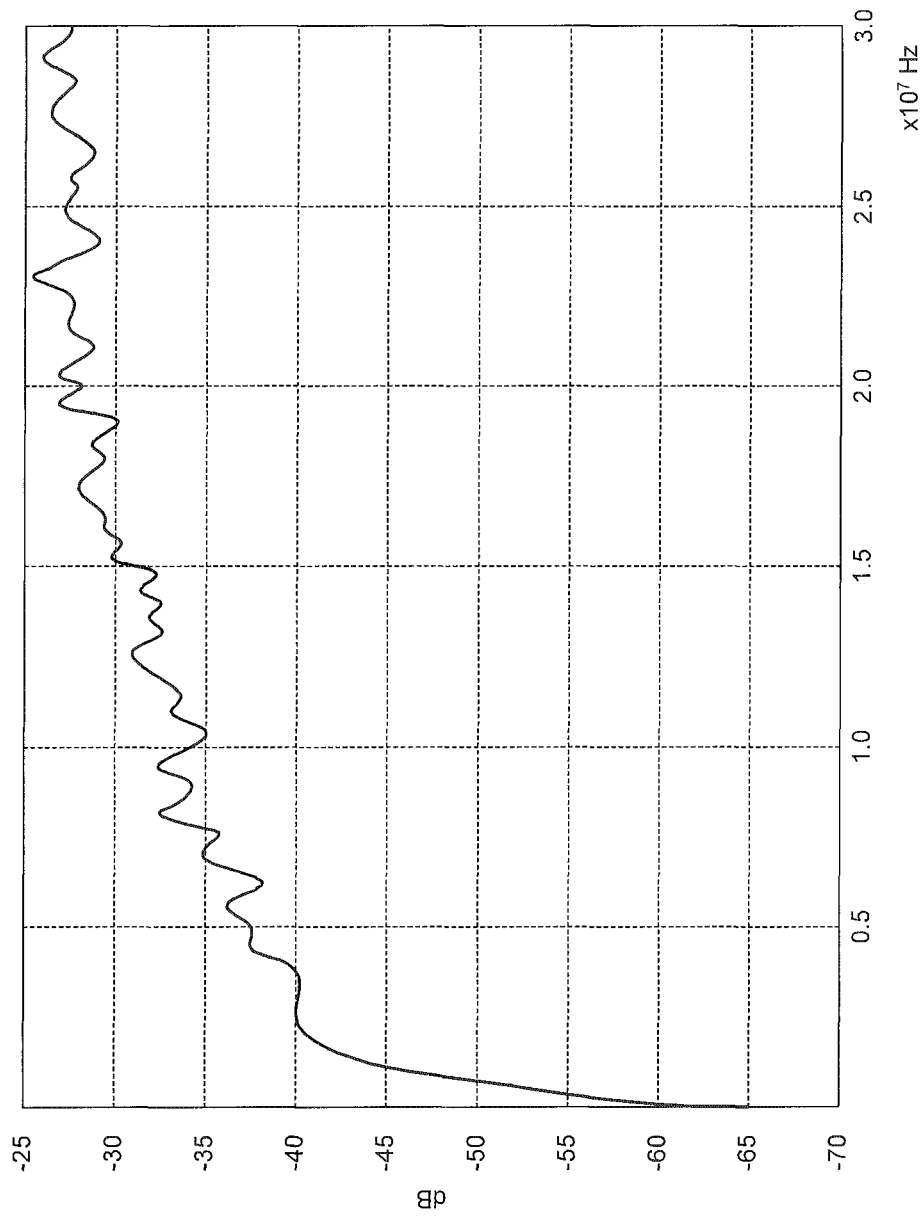
FIG. 2 is a typical FEXT channel response from 0 to 30 MHz from a telco binder cable.

As noted above, measurements on DSL cables show that the incremental change between adjacent tones' FEXT coefficients is small. This does not imply that FEXT is approximately constant across all tones, but rather that FEXT changes relatively smoothly from one tone to the next. For example, FIG. 2 shows an exemplary FEXT channel response curve from 0 to 30 MHz from a telco binder cable. Sub-channel spacing in DMT-based DSL systems is typically on the order of 4 to 8 kHz. As can be seen, incremental changes in FEXT between nearby sub-cannels is relatively small even though there is large variation over the complete 0 to 30 MHz band. In most FEXT cancellation schemes, the goal is a combined system in which the relationship between system inputs x and system outputs y is defined for downstream vectoring as y=HGx+n, where G is pre-applied to input data, where the matrix product HG approximates a diagonal matrix, where H is a matrix containing the MIMO system transmission data values $H_{ij}$ discussed above, where G is a matrix of FEXT pre-canceller coefficients $G_{ij}$ derived by the system, and where n is noise (or other uncorrelated distortion sources in the channel or electronics). For upstream vectoring, FEXT compensation is implemented as a post-canceller and y=G(Hx+n). For either downstream or upstream vectoring, one method for deriving G with full precision (i.e., calculating each full precision coefficient value of $G_{ij}$) utilizes the matrix inverse, so that if the FEXT coefficient between user i and user j at tone k is $H_{ij}(k)$, the pre-canceller or post-canceller coefficient is $G_{ij}(k)=H_{ij}^{-1}(k)$. As appreciated by those skilled in the art, there are other methods to compute these crosstalk cancellation coefficients. However, incremental change from $H_{ij}(k)$ to $H_{ij}(k+1)$ is small and some reduced-memory vectored DSL embodiments herein exploit the minor incremental variations of $G_{ij}(k)$ in consecutive tones. Exemplary embodiments provided in connection with downstream vectoring and a CPE providing downstream FEXT data (i.e., error signals collected by the CPE and sent upstream to the DSLAM for processing) can be applied equally to upstream vectoring, where the CPEs of a given group send test signal input data upstream to the DSLAM (upstream-end device) to generate FEXT data relating to upstream transmissions. The only material difference is that the benefits of reduced-memory transmissions to reduce upstream bandwidth usage are less relevant because the FEXT error signals are received, observed, measured and/or collected by the DSLAM (or other upstream-end device) rather than the CPE modems.

A practical exemplary vectored DSL system can have 128 users using 2,500 tones, leading to 32 cancellation coefficients per user (32 most significant FEXT sources for each user). Such a system operating with full precision for calculating and implementing inverse matrix G requires storage of 10 million coefficients, each requiring approximately 20-32 bits. As appreciated by those skilled in the art, materially reducing bandwidth and memory to store, transmit and process coefficients in such a system represents a substantial benefit. Total memory storage capacity/size in DSLAM side equipment is a concern; but coefficient memory bandwidth may be an even bigger concern. If this system uses a 4 kHz DMT symbol rate, 40 Giga-words of memory bandwidth are required (each coefficient must be loaded for each DMT symbol). The two storage options—on-chip and off-chip memory—both have drawbacks that negatively affect performance. For an exemplary memory requirement of 40 MB, on-chip memory for ASIC or FPGA implementations is very expensive in die size (ASIC) or simply not available (FPGA). This exemplary memory amount is possible with off-chip commodity DRAM, however the bandwidth of the channel between the memory and the vector processor is too slow to support vectoring (the entire content of the memory must be read in the 250 µs duration of each DMT symbol).

Various embodiments of reduced-memory vectored DSL use one or more of the following:
  (1) sub-sampling (or decimation) and approximate FEXT data reconstruction;
  (2) prediction (e.g., differential) filtering of FEXT data;
  (3) variable uniform quantization that depends on the tone corresponding to the FEXT data being compressed;

(4) variable quantization that depends on the tone corresponding to the FEXT data being compressed (e.g., mantissa-exponent quantization);
(5) lossless FEXT data compression (e.g., arithmetic, Huffman, Golomb coding);
(6) transform (e.g., Discrete Cosine Transform Threshold) coding of FEXT data;
(7) adjustable parameters involving information loss, where the parameters are adjusted to guarantee that compressed FEXT data will require no more than a specific amount of storage;
(8) linear prediction and/or linear transform coding to compute updates to already compressed FEXT data.

These types of steps, etc. can be characterized into three categories:
(1) Limiting the data (e.g., number of FEXT "data points") collected from a DSL receiver (e.g., using microbands in which FEXT data for only a subset of tones is collected);
(2) Reducing the precision of collected data (e.g., using smoothing, rounding, approximation, quantization, denoising, and/or the like); and
(3) Coding data points using proxy-type data to reduced memory storage, transmission and processing effects of these embodiments.

Again, implementation of one or a combination of these embodiments yields (1) a vectored DSL system that imposes less of a bandwidth burden for data transmission from CPE crosstalk data collectors to DSLAMs, and/or (2) a vectored DSL system with improved data storage, transmission and processing requirements at the DSLAM side for crosstalk cancellation coefficients and/or other FEXT cancellation data.

In some embodiments one or more microbands are defined within a "full set" of DSL tones (e.g., all tones used in a DSL system, all downstream tones used, all upstream tones used, a number of downstream or upstream frequency bands (each of which has a full set of tones), etc.). When "all tones" are referred to herein, this phrase is to be interpreted as "substantially all tones" because a minimal number of tones in a given range, especially a large frequency range, might not be involved in data transmission. Each microband can have an equal number of tones or not (e.g., number or spacing of tones in a microband may change based on frequency band position). Higher frequencies suffer from different FEXT problems than lower frequencies, so smaller microband sizes in high frequency ranges might be used; other variations will be apparent to those skilled in the art. In simple examples, some embodiments divide the full set of DSL tones (e.g., 256 or 4,094 tones in an entire system, or all tones in a given frequency band) into microbands that each contain the same number of tones. Using a small number of full-precision values for $G_{ij}(k)$ in each microband, $G_{ij}(k)$ values for the remaining tones can be approximated. Careful selection of an approximation model thus reduces back-channel communication and memory storage demands in such vectored DSL system. While $G_{ij}(k)$ is used as the exemplary quantity for determining full-precision and approximation values, other FEXT-related quantities/values (e.g., $H_{ij}(k)$, a DSL line output error signal at a modem) can be used.

Vectoring modems exchange real-time FEXT information with other modems in the vectored group (same or multiple chassis units). Using a typical DMT symbol rate in the range of 4 kHz to 8 kHz, FEXT cancellation must be done over the vectored bandwidth once per DMT symbol with a processing delay on the order of a few DMT symbols (or less) to avoid latency problems, creating a complex data network in which each line card shares real-time FEXT information from each of its modems with each of the other system modems (e.g., on other line cards, chassis, etc.). In a typical DSLAM system, the transfer of vectoring data can be tens of gigabits per second. Current DSLAM backplanes cannot handle this additional transfer load, and future DSLAM backplanes need a practical method for managing this data transfer flow with reasonable complexity and operational performance. Significant FEXT coupling can come from adjacent binders or even different cables that terminate in the same telco node due to use of a "cross box" or patch panel in the telco node. These patch panels are used to map individual copper pairs (possibly from different binders or telco cables) to specific modem ports on the DSLAM line cards. Also, when a single modem port cannot provide the desired data rate, bonding multiple modem ports together can increase a customer data rate (with a second port added to provide additional services—the multi-port DSL service has the potential to carry more data, operate at faster speeds, etc.). Some systems require bonded modem ports to be connected to the same line card; this is impractical for some telcos for the same reasons that binder group management is impractical. Finally, the computational demands of DSL vectoring—especially real-time crosstalk data processing with user data signals—create data transmission bottlenecks and processing problems. The large volume of data needs to be processed quickly (to reduce latency/delays), and must be efficiently transmitted and processed. Embodiments provide systems, apparatus, methods, etc. that efficiently handle and process these large amounts of data with little negative effect on the latency and/or performance of the DSL lines being vectored.

A vectored DSL system and measurements therein suffer from inherent noise, and errors in estimated FEXT data degrade system performance. Noise effects can be mitigated by time-averaging (many measurements made of the same quantity); if noise corrupting measurements is statistically stationary, then measurements can be more precise, though this takes more time. A collection of data smoothing (e.g., denoising) techniques remove noise effects without requiring extra time for noise-averaging. Limited time for collecting channel measurements also means that estimates are available only on a limited subset of tones used for transmission (e.g., using estimates on one in four tones). The complete precoder/cancellation coefficient set for every tone in use must be derived from this limited measurement set. Sub-sampling (or decimation) of estimated coupling functions can bring them to a rate compatible with precoder/cancellation apparatus. High precision knowledge of FEXT data is desirable, but there limit to those benefits and indeed higher precision data requires more storage memory. It is beneficial to retain only as much precision as is needed to get the quantization error below a certain threshold to provide adequate system performance and the least possible memory. Uniformly spaced quantization using a quantization interval that varies according to the tone frequency or microband is used in some embodiments to control loss in a Signal to Quantization Error Ratio relative to noise (background, thermal or other unavoidable system noise).

A linear prediction filter can extract or define the correlation in the FEXT coupling (or, e.g., precoder/cancellation coefficients), and the computation of the error sequence between the prediction filter output and the actual or estimated FEXT coupling as a way to reduce the mean absolute value of the integers representing the FEXT coupling (or precoder/cancellation coefficients). Alternatively, quantized FEXT data for one disturber/victim pair can be transformed using the Discrete Cosine Transform. The absolute values of the transformed sequence are compared to a threshold and values of the transformed sequence are discarded if their absolute value is less than the threshold, and retained otherwise.

Variable-length entropy coding (e.g., arithmetic, Huffman or Golomb coding) can further compress FEXT data and be used with subsampling, quantization and prediction. Adjustable parameters to control information loss can be initialized with more loss to ensure that compressed FEXT data fits into available memory; estimates then are successively refined to reduce the error until the memory usage reaches a pre-determined threshold. Compressed FEXT data can be updated when the prediction error is computed using additive updates to the previous set of decompressed FEXT data, the result then being encoded and stored as the new set of FEXT data. Using one or more of these approaches, techniques, etc. alone or together can reduce or eliminate communication bottlenecks that otherwise confront vectored DSL systems. Such embodiments are scalable, from small port-count systems (e.g., a single line card system) up to much larger systems (e.g., thousands of ports spread across multiple line cards and/or chassis). Such embodiments work with both optical interconnect technologies (in the case of multiple chassis systems or line card upgrades to legacy chassis equipment) and also with future copper interconnect technologies in which all communications flow within a single DSLAM on a copper backplane or using high bandwidth copper interconnect. Embodiments also permit "virtual bonding" that allows telcos to virtually bond modem ports across multiple line cards and/or multiple chassis.

Figure 3:
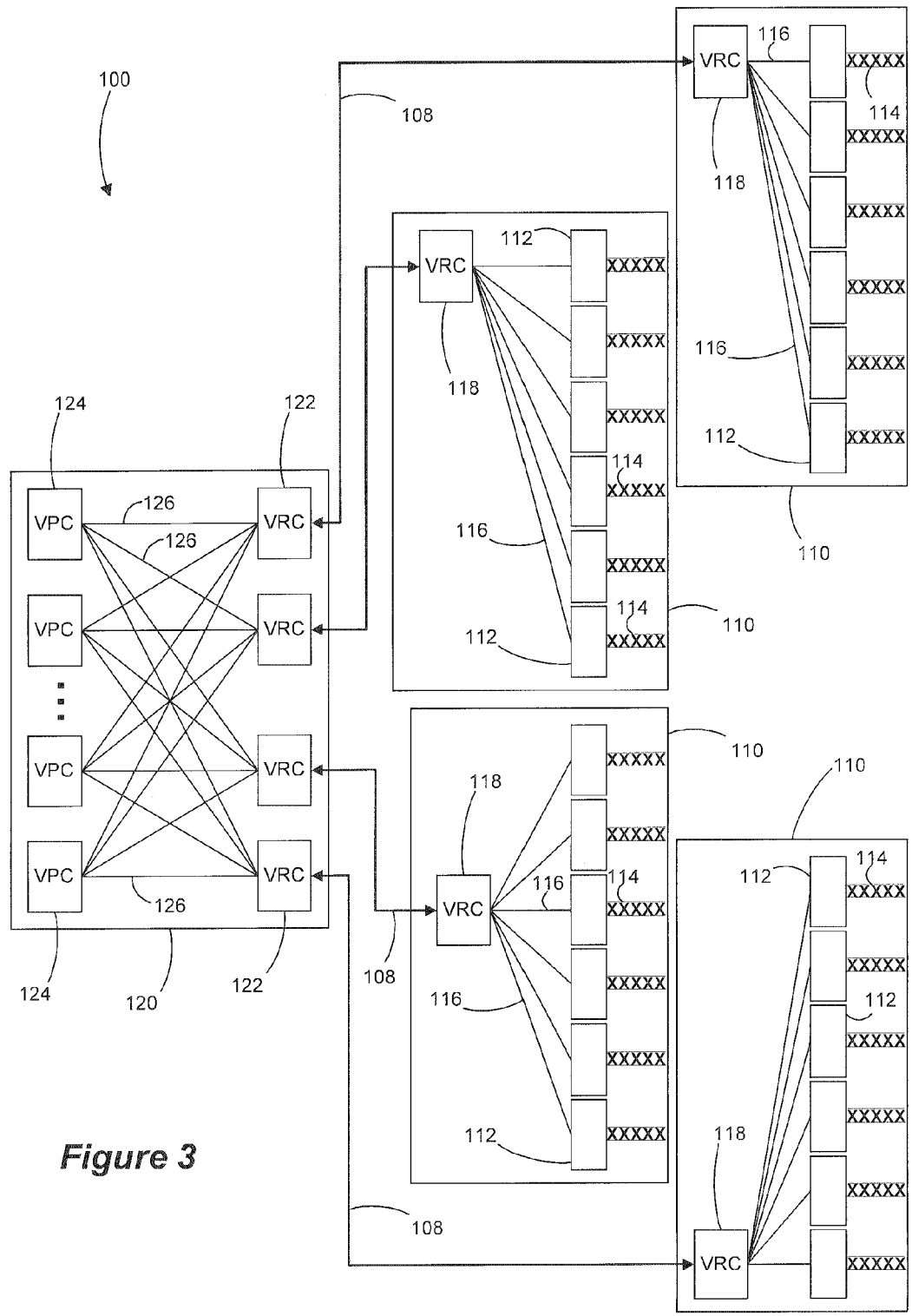
FIGS. 3 and 5-9 are block diagrams of vectored DSL systems according to one or more embodiments of the present invention.

FIG. 3 illustrates a vectoring data communication system 100 in which line cards 110 contain DSL modems 112 (for example, multi-port devices) that control communications on twisted-pair lines 114. Multiple line cards 110 are connected via a high speed communication apparatus, such as XAUI lines 108 or the like in FIG. 3 to a vectoring control entity (VCE) that can be or include centralized vectoring module 120 (which can be, for example, a vectoring card). High-speed data communication lines 116 connect modems 112 to line card vector router components (VRC-Ls) 118. VRC-Ls 118 form an abstraction layer for modem 112, as modem 112 needs to connect to only one VRC-L 118 and the complexity of the specific vectoring deployment (e.g., number of ports, line cards, etc.) is thus hidden from each modem 112.

The vectoring data flow from each modem 112 to its respective VRC-L 118 includes frequency domain samples for downstream and upstream communications—that is, IFFT-input transmit (TX) data for downstream vectoring and/or FFT-output receive (RX) data for upstream vectoring. The data returned to each modem 112 from vectoring module 120 via a VRC-L 118 is the modem's crosstalk-adjusted (vectored) IFFT-input and/or FFT-output data that is conditioned and/or processed to prevent and/or remove crosstalk interference from other vddg lines. The VRC-L 118 in each line card 110 acts as an interface between that line card's modems 112 and vectoring module 120. High-speed lines 108 network a VRC-L 118 on each line card 110 to a companion VRC-V 122 on vectoring module 120. The VRC-Vs 122 on vectoring module 120 subdivide the modem vectoring data stream into microbands for subsequent crosstalk cancellation in one or more vector processors (VPCs) 124, as defined by system requirements. The vector processors may also be referred to as "vector processor components," "computational devices" and/or the like. That is, data is removed from a normal (i.e., non-vectored) data stream in each modem and is reorganized into data bundles defined by frequency characteristics so that the data can be crosstalk-processed on a frequency basis (for example, tone-by-tone, groups of tones, etc.). Once processed, the data is again reorganized from the frequency-based bundles used for crosstalk-removal processing and is reassembled for transmission/use by the modems.

For example, upstream and downstream bands can be vector routed by one or more VRCs (e.g., a VRC-L/VRC-V pair) to individual VPCs. A vector router is a specialized data networking device or subsystem that implements a specialized "private" data network, which can be similar to an Ethernet network, for the purpose of efficiently moving vectoring data between modems and vector processors to avoid processing or data transmission bottlenecks. Packets of vectoring data can contain headers and/or other state information enabling efficient routing of the vectoring data over the data network without the need for dedicated links between each modem and vector processor device. To this end, a vector router also converts vector data packets from a format readily supplied by the modems into a format that is naturally utilized by the vector processors, then converting back again after vectoring has been performed (for example, interleaving and de-interleaving of the modem vectoring data stream). This task may be split between VRC-Ls and VRC-Vs, or performed in only one or the other, depending on the configuration. Alternately, VPC assignment can be based on evenly spaced microbands (independent of upstream and downstream band allocation). Data transmission between VRC-Vs 122 and VPCs 124 on the vectoring module 120 can be performed using high speed interconnect lines 126.

The exemplary packet structure illustrated in FIG. 4 allows for real-time vectoring of data between a number of DSLAM-side modems (e.g., VTU-Os) and a vectoring control entity (VCE). Request packets containing payload data in the form of unprocessed user data (i.e., user data for which crosstalk effects have not been compensated—also referred to as "uncorrected" data or signals herein) for vectoring are sent to a vector processor or the like, where vectoring processing compensates for crosstalk effects in the unprocessed user data DSL signals. The processed DSL data is then repacked as payload data and sent in reply packets back to the respective modems that supplied the unprocessed user data (request and reply packets typically use similar configurations). A packet is constructed (e.g., by the VRC-L) with non-vectored data sent from every modem, and this packet is sent for vectoring processing once per symbol for each tone and modem/port range. Essentially, non-vectored data sent to a VPC gets unpacked, vectoring processed, re-packed in reply packets that are similar to the non-vectored data packets, and subsequently transmitted back to modems in reply packets, which return vectored data in the same format as the non-vectored data that was transmitted by the modems. The packing and unpacking of data by a VRC-L or the like follows the line card and/or modem port map so that vectored data is returned to the modem/port from which its corresponding non-vectored data was extracted (i.e., request packets and reply packets can be identified by their modem or modem port of origin). Other types of packets can be used in connection with embodiments of the present invention. For example, along with the vector data packets described, vector error packets, vector configuration packets and vector control packets can be sent throughout the vectoring data network to configure, adjust, etc. the vectored DSL system as appropriate (e.g., to configure, control or synchronize modems chips or to configure, control or synchronize vector processors). Any of the packets described herein can include one or more modem port identifiers, a modem chip identifier, a line card identifier, a chassis identifier, or information identifying at least one DMT tone range so that tracking and addressing of the packets is achieved.

For vector request packets, the payload data can include inverse fast Fourier transform samples for a plurality of modem ports and tone sets identified in the request packet header, fast Fourier transform samples for a plurality of modem ports and tone sets identified in the request packet header, downstream frequency domain data for a plurality of modem ports and tone sets identified in the request packet header, and/or upstream frequency domain data for a plurality of modem ports and tone sets identified in the request packet header. Additional fields and components of the packet can be utilized (for example, a cyclic redundancy check or CRC). A vector error packet can include upstream training error samples for the modem ports and tone sets identified in the request packet header, upstream tracking error samples for the modem ports and tone sets identified in the request packet header, upstream DMT sync symbols for the modem ports and tone sets identified in the request packet header, downstream training error samples for the modem ports and tone sets identified in the request packet header, downstream tracking error samples for the modem ports and tone sets identified in the request packet header, and/or downstream DMT sync symbols for the modem ports and tone sets identified in the request packet header.

The embodiment of FIG. 4 shows the vectoring data packet format defined for modems serving N ports and vectoring data transmitted to/from the modems over the DSL vectoring data network (also referred to as the "private network," "routing subsystem," "vector routing network," "special network" or the like) has this format. The VRC-L adds a header on such a packet to identify the modem chip and line card, so the source of the data is known as the packet flows to the VRC-V (or, if no VRC-V is on the vectoring card, then to whatever destination is used in the vectoring card) and then on to the VPC/VPU. As vector-processed data comes back from the vectoring card to the VRC-L (or, if no VRC-L is used, then to the modems from which the vectoring data was extracted and transmitted), this header is removed before distributing the packets back to the appropriate modem chips. The VRC-L and/or VRC-V may optionally re-assemble packets from multiple modem chips into a format for use by the VPCs, depending on how the modems provide the data. Use of such packets and headers (coupled with vector router use in some embodiments) allows the vectored DSL system to scale to larger (or smaller) numbers of ports, and no hardwired/dedicated data bus is required between each modem and vector processor. Appropriate error signal packets and configuration and control messages also can flow over the network accordingly.

The VRC pairing configuration 118, 122 effectively converts data consideration from a per-port modem basis to a per-band (or per-frequency-set) VPC basis, at least for crosstalk cancellation pre-processing. Because crosstalk cancellation is most effectively performed in the frequency domain on a per-tone, per-microband, per-band or per-tone-set basis, this conversion greatly reduces the complexity of the vectoring system's implementation. Matching microbands (i.e., groupings of the same one or more frequencies and the like) from every modem 112 in the vectoring system 100 are collected and aggregated to enable crosstalk cancellation inside a VPC 124 between each victim modem and any set or subset of disturber modems. As will be appreciated by those skilled in the art, the microbands assigned to each VPC 124 do not have to consist of contiguous frequencies in the system. For example, if there are 6 VPCs 124 in vectoring module 120, each consecutive VPC 124 may take the next frequency or frequency bin, meaning that the "first" VPC 124 will get frequencies 1, 7, 13, 19, etc. and the "fourth" VPC 124 will get frequencies 4, 10, 16, etc. Alternately, each VPC 124 can be sent a tone set, for example groups of 8 tones each, so that the first VPC 124 gets tones 0-7, the second VPC 124 gets tones 8-15, etc. Such distributions of data can provide a more "even" usage of available resources, for example preventing "clogging" of one or more given communication lines 126 due to a data dump from the relevant VRCs 122 to a single VPC 124 while the remaining VPCs 124 and lines 126 are idle.

The data on the private vectoring data network of system 100 consists of special purpose packets identifying the source modem 112 and destination VPC 124. Alternatively, the source and destination address can be implied by the packet timing. Each packet consists of IFFT input (and/or FFT output) data for one microband to/from one modem 112. Because DMT-based DSL systems operate using a DMT symbol period, data communications from the modems 112 to the VPCs 124 and back again are repeated for every DMT symbol, possibly using pipelining of the communication and computation to use available networking bandwidth and computational resources more efficiently. Per-tone training/tracking error signals, diagnostic data to/from the modems 112 and other configuration and/or management data can use the same networking communication path and packet structure.

Various hardware devices and/or components can be used to implement reduced-memory vectored DSL embodiments. Various current FPGAs and the like are suitable for constructing configurations according to embodiments illustrated herein. For example, Altera Stratix IV GX FPGA devices (e.g., EP4SGX70, EP4SGX110, EP4SGX230, etc.) are appropriate for some implementations. In some embodiments each VPC 124 is a separate chip (FPGA, ASIC, etc.) on which multiple VPUs are programmed as defined below. Other hardware configurations will be apparent to those skilled in the art.

Figure 5:
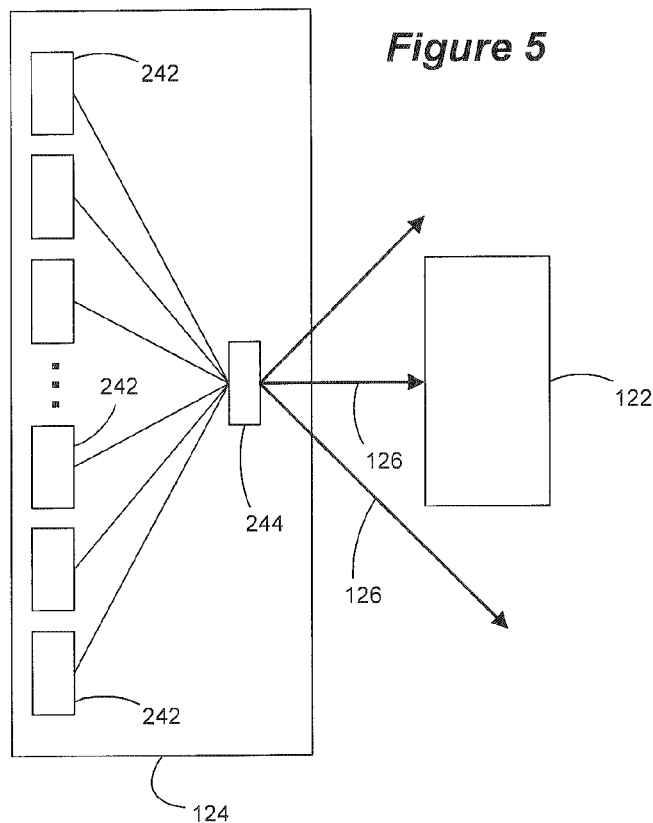

As illustrated in FIG. 5, each VPC 124 contains or implements one or more dedicated vector processing units 242 (VPUs), each of which performs vectoring for a subset of the modems and/or disturbers. Allocation and/or sharing of the VPU resources may be advantageous in some cases and can be accomplished in various ways. For example, each VPC 124 can contain a centralized set of VPUs 242 that are time-shared among all of the modems 112 for vectoring within a given microband. Alternately, each VPC 124 can contain a distributed set of VPUs 242 in which each VPU 242 is dedicated to a particular modem 112 within the microband assigned to the VPC 124. Multiple VPUs 242 can coordinate communication between their host VPC 124 and one or more VRC-Vs 122 using a VPU dispatcher 244 or the like. A VPU 242 processes all of the IFFT/FFT data for a tone set (e.g., a single tone, a group of tones, a band or microband of tones, etc.) for all of the modems making up the vectored DSL system. The VPU 242 processes this data once per DMT symbol, in a somewhat periodic manner. As noted above, in some embodiments, each VPC 124 is a collection of one or more VPUs 242, where each VPU 242 independently processes its batches of tones without any explicit communication with other VPUs 242. In a simple exemplary setting, a system might use 4096 tones, 2 VPUs, and N modems. Each VPU 242 handles tones in batches of 16 tones. Tones can be assigned to VPUs as follows:

VPU0: tones 0-15, 32-47, . . . .
VPU1: tones 16-31, 48-63, . . . .

In this example, the modems provide their FFT/IFFT data to the VRC-based private network in tone order from 0 to 4095. When the FFT/IFFT data gets routed to the VPCs, the VRC distributes data like "dealing cards" to the two VPUs in batches of 16 tones. This keeps the data networking pathway and VPUs uniformly busy without bottlenecks. For each tone, the VPU performs the equivalent of an N×N matrix multiply to perform vectoring (or maybe less than a full N×N multiply if the vectoring matrix is "sparse").

Each VPU has a pre-determined processing capability level (e.g., number of complex multiplications per second), based on the logic design and chip technology utilized. Also, the required level of processing power "per tone" for the vectoring system will increase as the number of modems, N, increases. Thus, the required number of VPUs is a function of the number of modems in the system and the number of vectored tones over the DMT bandwidth. Therefore, systems with a large number of vectored tones and/or a large number of modems will consequently need a larger number of VPU resources (and consequently VPC chips) to perform vectoring. That is, as the number of modems increases in a vectored system, the number of tones that each VPU can process will decrease due to the additional modems' data that need to be processed. As will be appreciated by those skilled in the art, the size of each microband can be determined by cost and complexity limits for a given implementation, as well as the DSL band profiles that are supported by the design. For example, in an implementation for a system having a 17 MHz VDSL profile, 384 modems, and vectoring up to 64 disturbers per modem, a practical system would have on the order of 128 VPUs with each VPU processing 32 tones per DMT symbol. As the VPU logic is reconfigured to reflect any changing dimensions of the system (number of modems, number of vectored tones, etc.), vector routing is adjusted accordingly.

Figure 6:
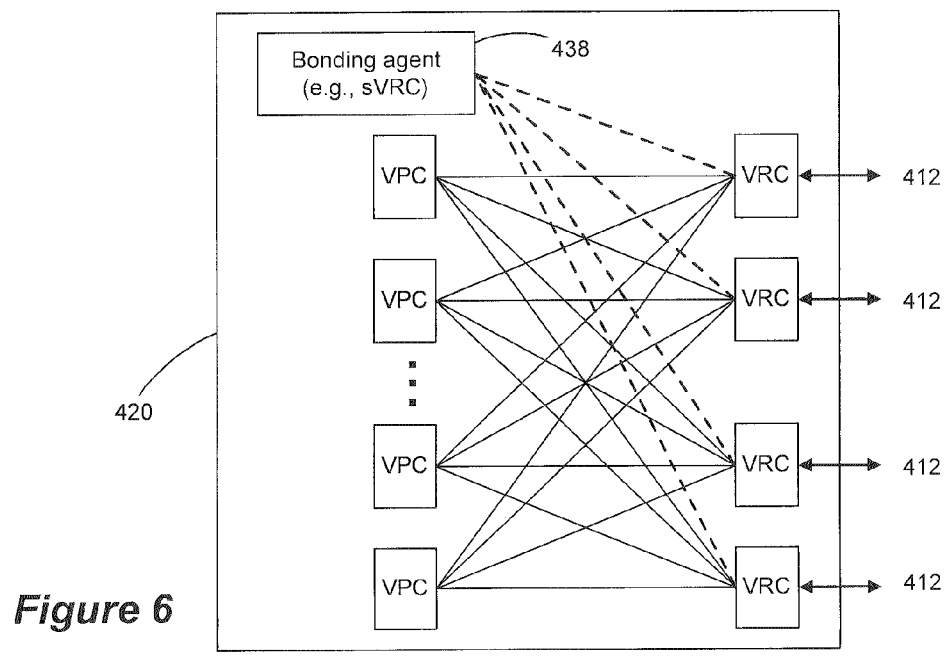
Figure 7:
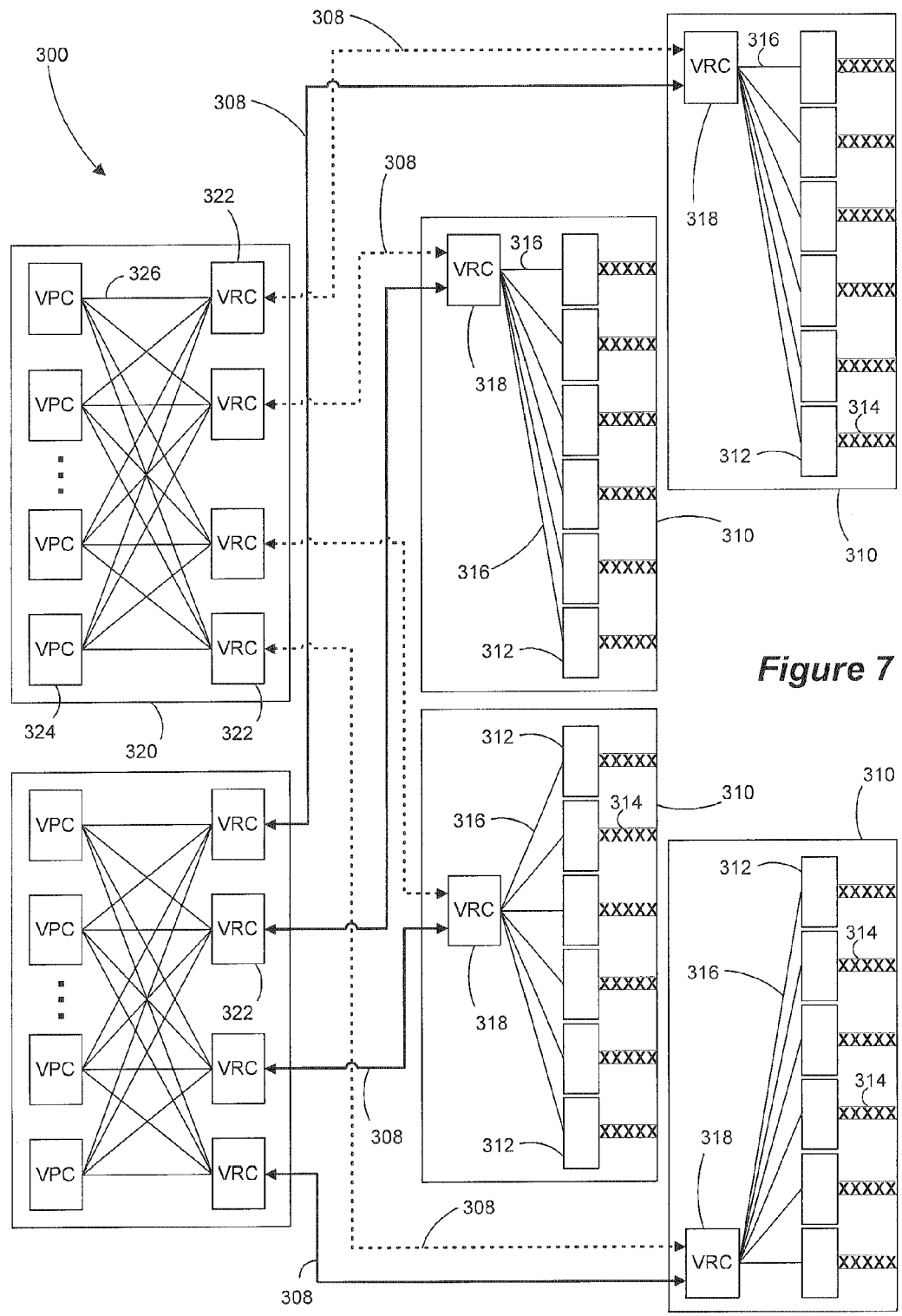

In embodiments of the present invention such as the one shown in FIG. 7, the vectoring system 300 may exceed the practical complexity for a single card used as the vectoring module 120 (e.g., power consumption, card area, etc.). The system illustrated in FIG. 7 permits splitting or allocating vectoring processing of system 300 onto multiple vectoring cards 320 (in a chassis, in a module or in multiple modules) where each card 320 performs crosstalk cancellation over some fraction of the total DSL frequency band. With this configuration, vectoring can be performed in systems with hundreds or even thousands of simultaneously operating modems. VPCs typically do not need to communicate with each other explicitly, although they will be roughly synchronized implicitly by the flow of the FFT/IFFT data and training signals coming from the modems. In the embodiment of FIG. 6, the vectoring data transmission path from each modem 412 to a vectoring card 420 can be further utilized to serve a dual function and perform "virtual bonding." In addition to passing crosstalk cancellation data, each modem 412 in a bonded modem group (i.e., two or more modems serving a user in a bonded fashion) passes customer data streams (e.g., IP packets) along this same communication path. One or more bonding routers 438 (acting as a supplemental VRC (sVRC), bonding agent and/or controller) on vectoring card 420 connect via VRC-Vs 418 to each VRC on its respective line-card. Each bonding router 438 performs routing between VRC-Vs and, thus, their respective VRC-Ls. This effectively creates a data path between and/or among any two or more modems in the vectoring system and multiple modem ports can then be bonded in the vectoring system, provided that one of the two modems performs the aggregation function and presents the total bonded data stream to the uplink path of the DSLAM, as will be appreciated by those skilled in the art.

Figure 8:
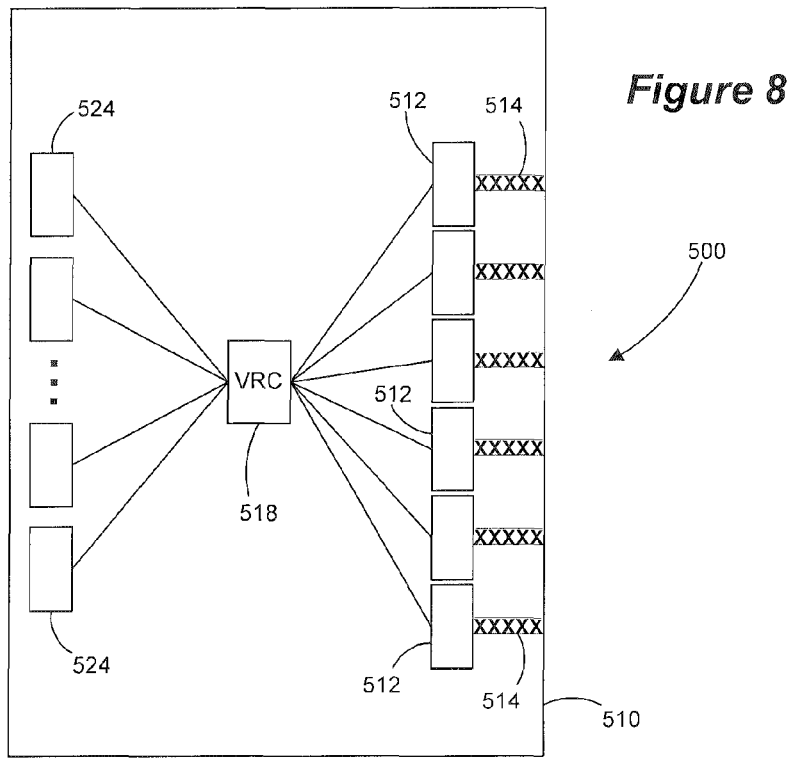
Figure 9:
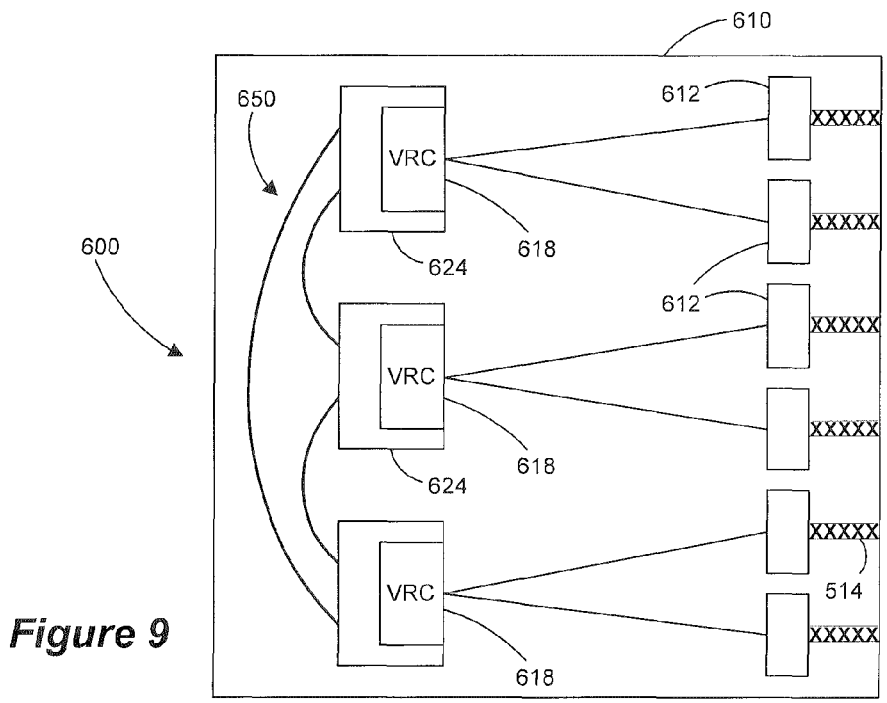
Figure 15:
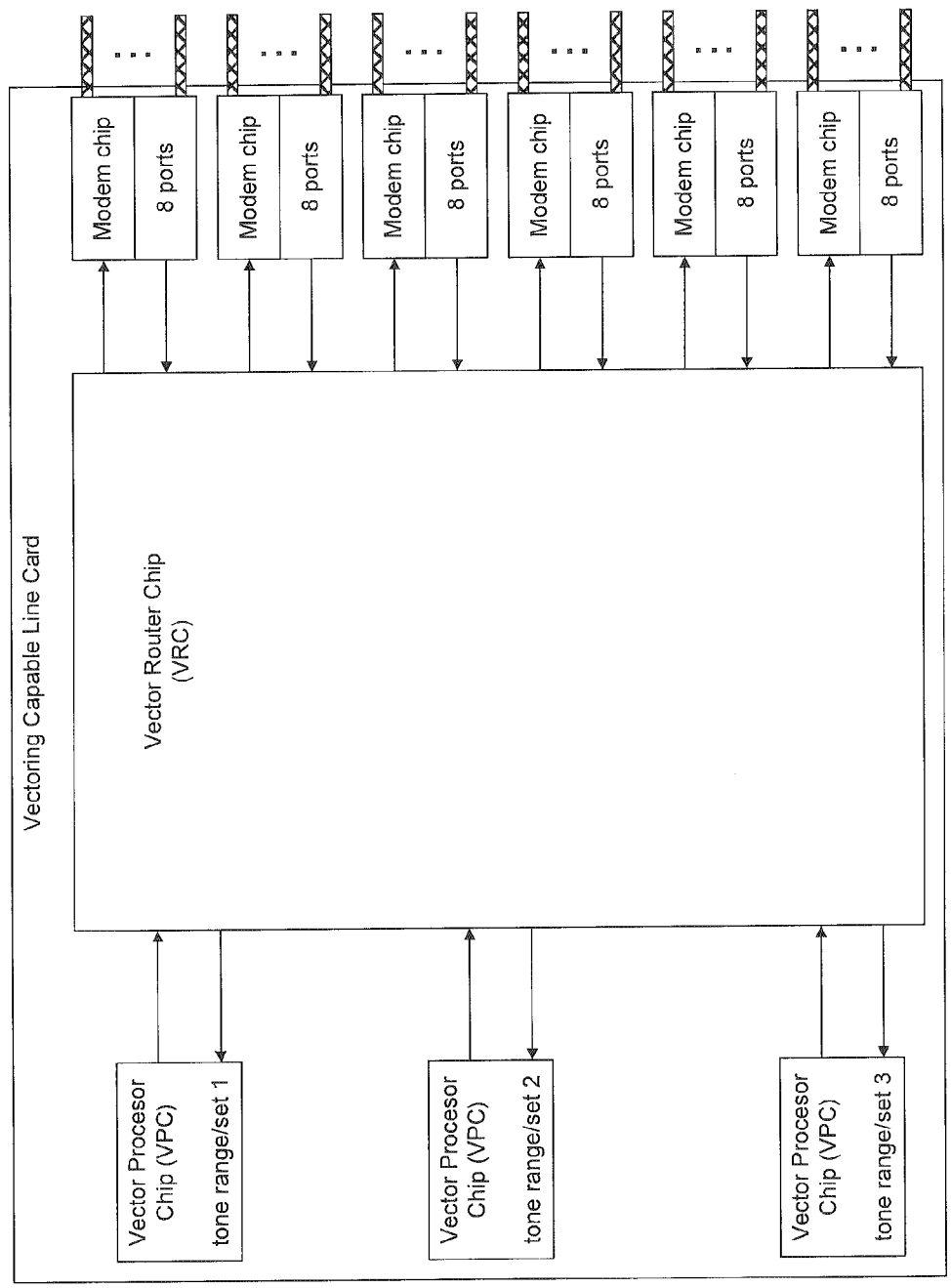
FIGS. 15-19 are various block diagrams of vectoring data network configurations according to one or more embodiments of the present invention.

In yet another reduced-memory vectored DSL embodiment in FIG. 8, a simplified system 500 fits onto a single line-card 510 (see also FIG. 15). Once again, VRC resources 518 (a single VRC, for example, or alternately two VRCs back-to-back) provide routing between modem ports and the VPCs 524 that provide processing of designated microbands. In low port-count systems with only modest networking communication bandwidth, the VRC functionality 618 can be situated directly inside each VPC 624, as illustrated in the embodiment shown as system 600 in FIG. 9. For example, where an FPGA is used as the VPC 624, a portion of the FPGA configuration is dedicated to the routing functionality. In this case, the cost savings realized by removing an independent vector routing device from the system outweigh the additional communication requirements. FIG. 9 shows both daisy chain and mesh network connection options 650 between VPCs 624. In practice, one or the other would be utilized (not both) based on communication requirements and tradeoffs for the system.

Figure 10:
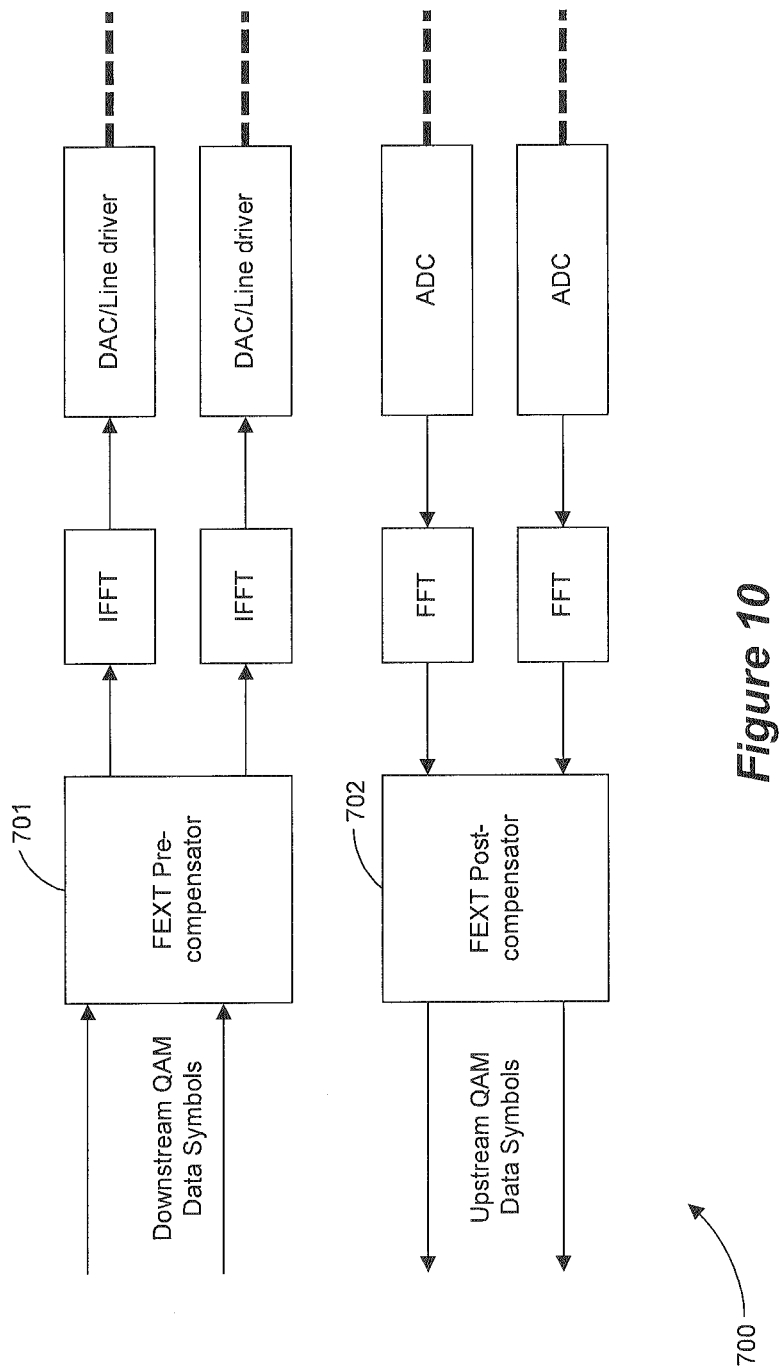
FIG. 10 is a block diagram of a DSL data processing stream in which embodiments of the present invention can be implemented.
Figure 11:
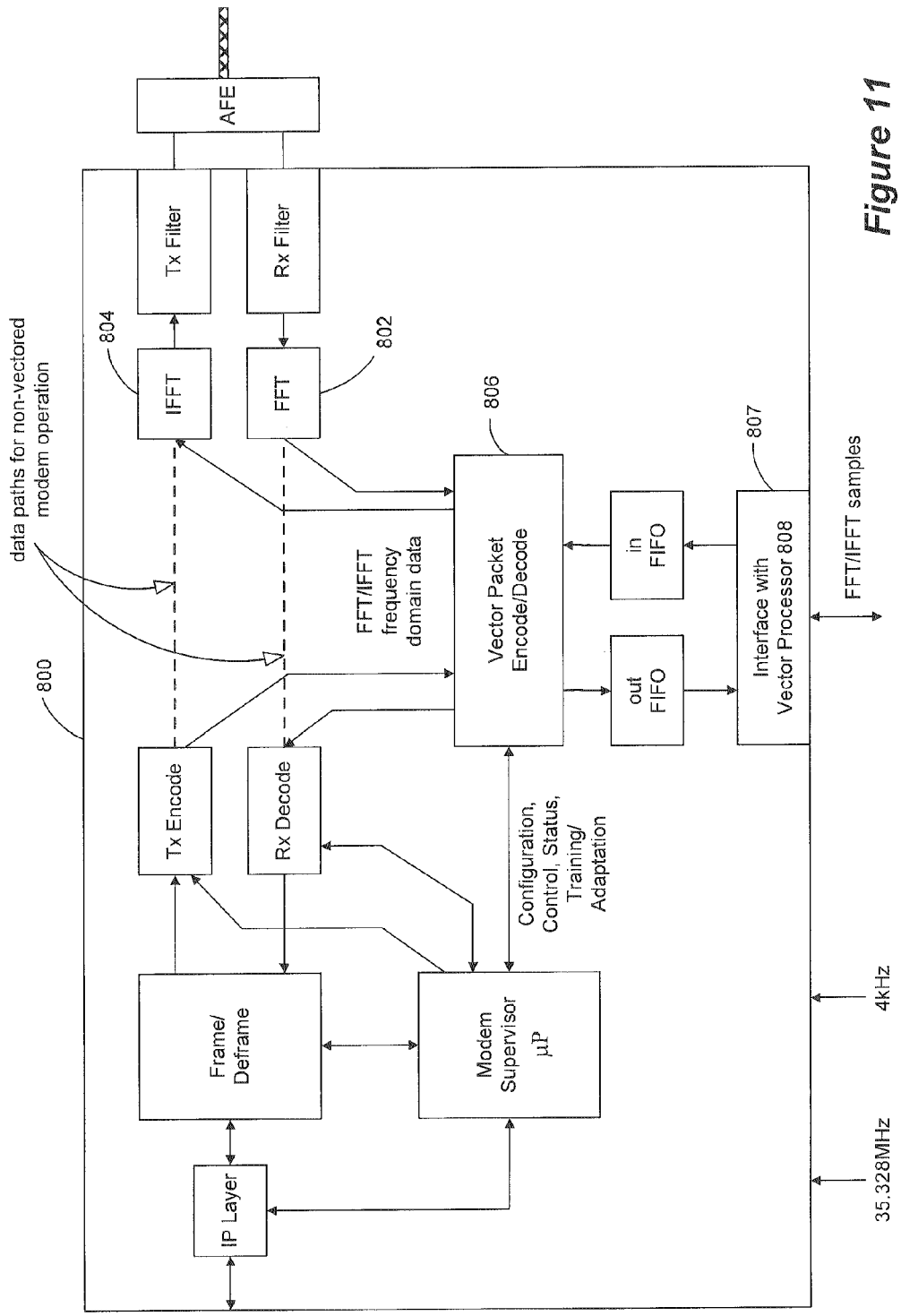
FIG. 11 is a block diagram of a DSLAM modem in which embodiments of the present invention can be implemented.

FIG. 10 illustrates general operation of the vectoring operation 700, wherein efficient implementation of the downstream FEXT pre-compensator 701 and upstream FEXT post-compensator 702 can be accomplished using one or more embodiments. In the downstream direction, a plurality of QAM data symbols from a plurality of modems is FEXT pre-compensated by coordinating or "vectoring" communication among all modems on a per-tone basis, followed by subsequent IFFT and digital-to-analog conversion operations on a per-modem basis to transmit the FEXT-compensated signal onto the Telco copper pair. In the upstream direction, a plurality of received FFT samples is FEXT post-compensated by coordinating or "vectoring" communication among all modems on a per-tone basis, followed by subsequent decoding of the QAM data symbols on a per-modem basis. FIG. 11 shows a generic modem port for a commonly available DSLAM side VDSL modem device 800 that has been modified to support vectored communication in one or more embodiments. The upstream FFT 802 outputs and the downstream IFFT 804 inputs are intercepted by a vector packet encoder/decoder 806 (or "vectoring data extractor") and sent to a vector processor 808 via interface 807 to allow vectoring of the data stream among all modems in the vectoring group. By removing, processing and "reinserting" data from the data stream, such a vector processor system may introduce a small number of symbols of latency in the modem's receive and transmit data paths.

Figure 12:
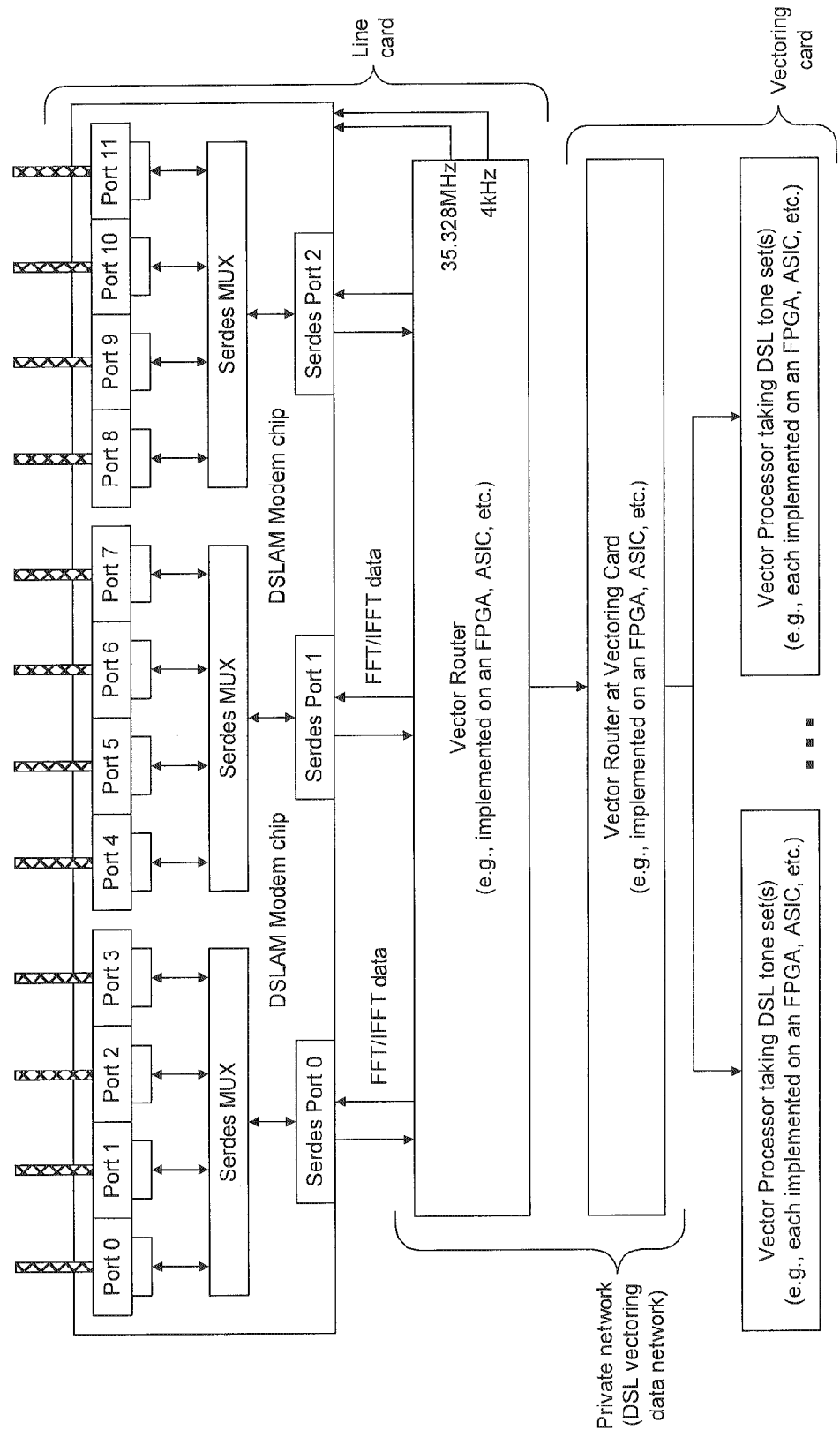
FIGS. 12-14 are block diagrams of DSLAM modem chip interfaces with a vectored DSL system according to one or more embodiments of the present invention.
Figure 13:
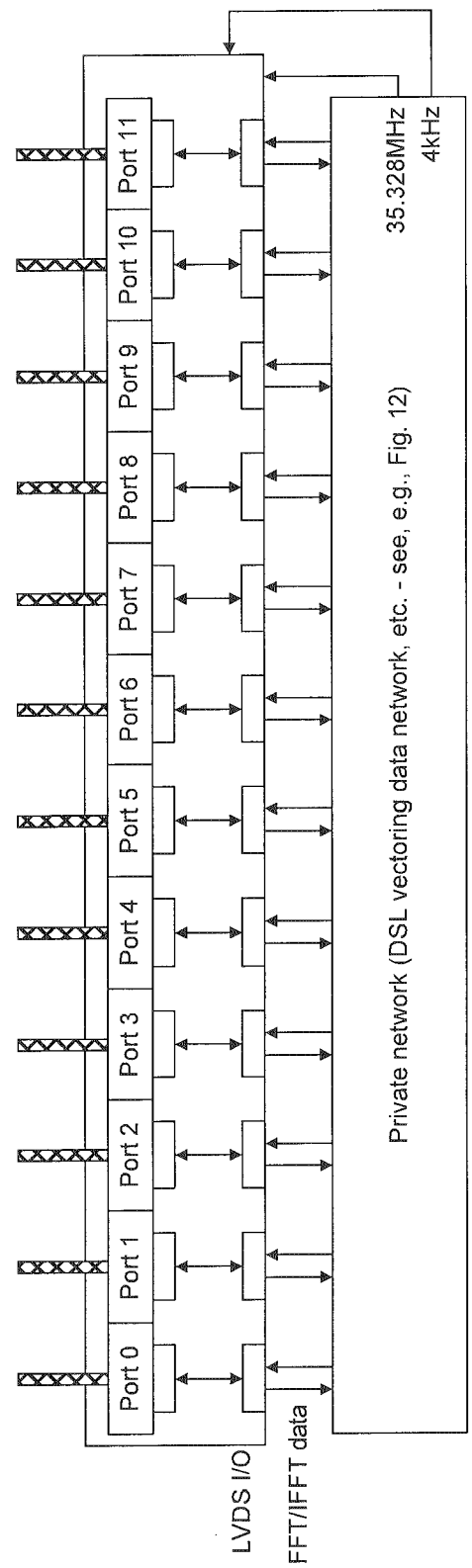
Figure 14:
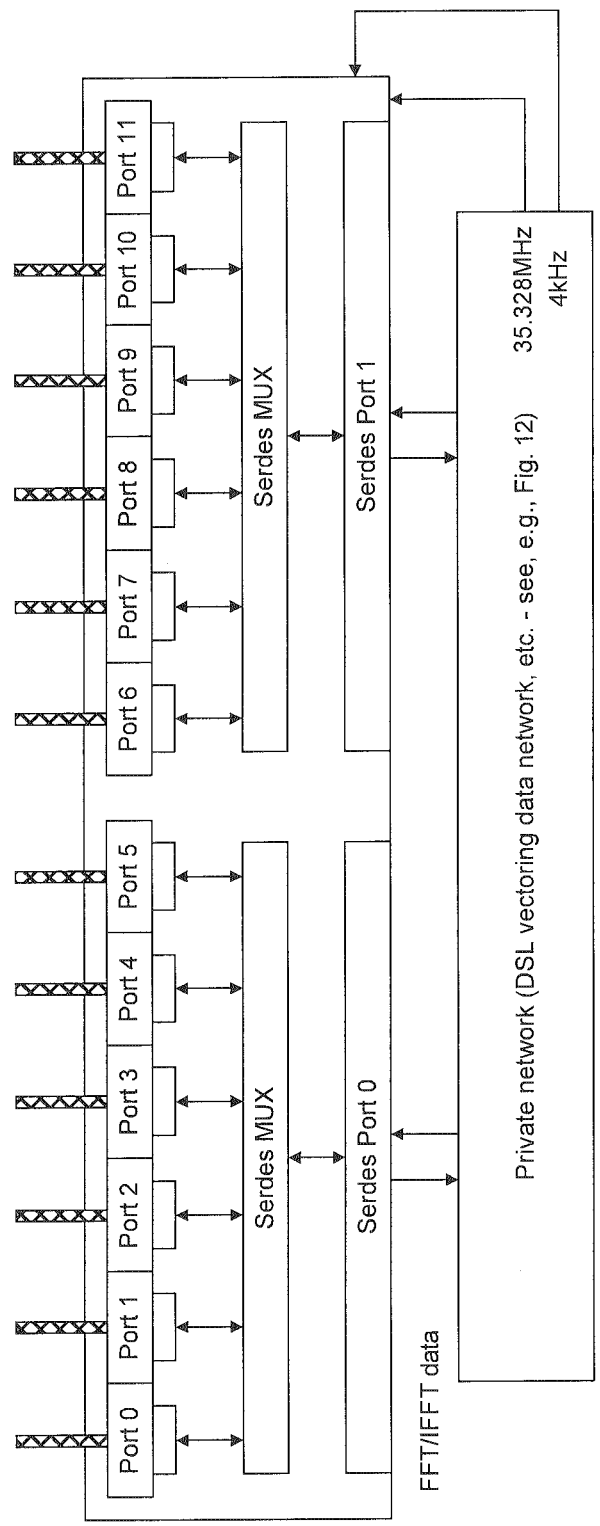

FIGS. 12-14 provide several specific embodiments of a DSLAM side modem configuration for communicating with a vector processor chip, specifically showing possible interfaces between a modem chip and a VRC. FIG. 12 shows the configuration of a 12-port, ITU 993.2 Profile 30a profile vectored VDSL DSLAM side modem chip that supports vectoring (e.g., a 5G serializer/deserializer or "Serdes" type). To make efficient use of multi-port modem chip I/O pins and reduce power consumption, a high-speed serial interface is used to aggregate FFT/IFFT data from each modem device over a single data networking link either directly to a vector processor chip or to a vector router chip for subsequent forwarding to a vector processor. FIG. 13 illustrates a 12-port, ITU 993.2 Profile 30a profile vectored VDSL DSLAM side modem chip that supports vectoring. In this embodiment, low voltage differential signaling (LVDS) interface circuits (1 LVDS per modem port) are used. FIG. 14 illustrates a 12-port, ITU 993.2 Profile 17a vectored VDSL DSLAM side modem chip that supports vectoring (e.g., a 5G Serdes type).

Figure 16:
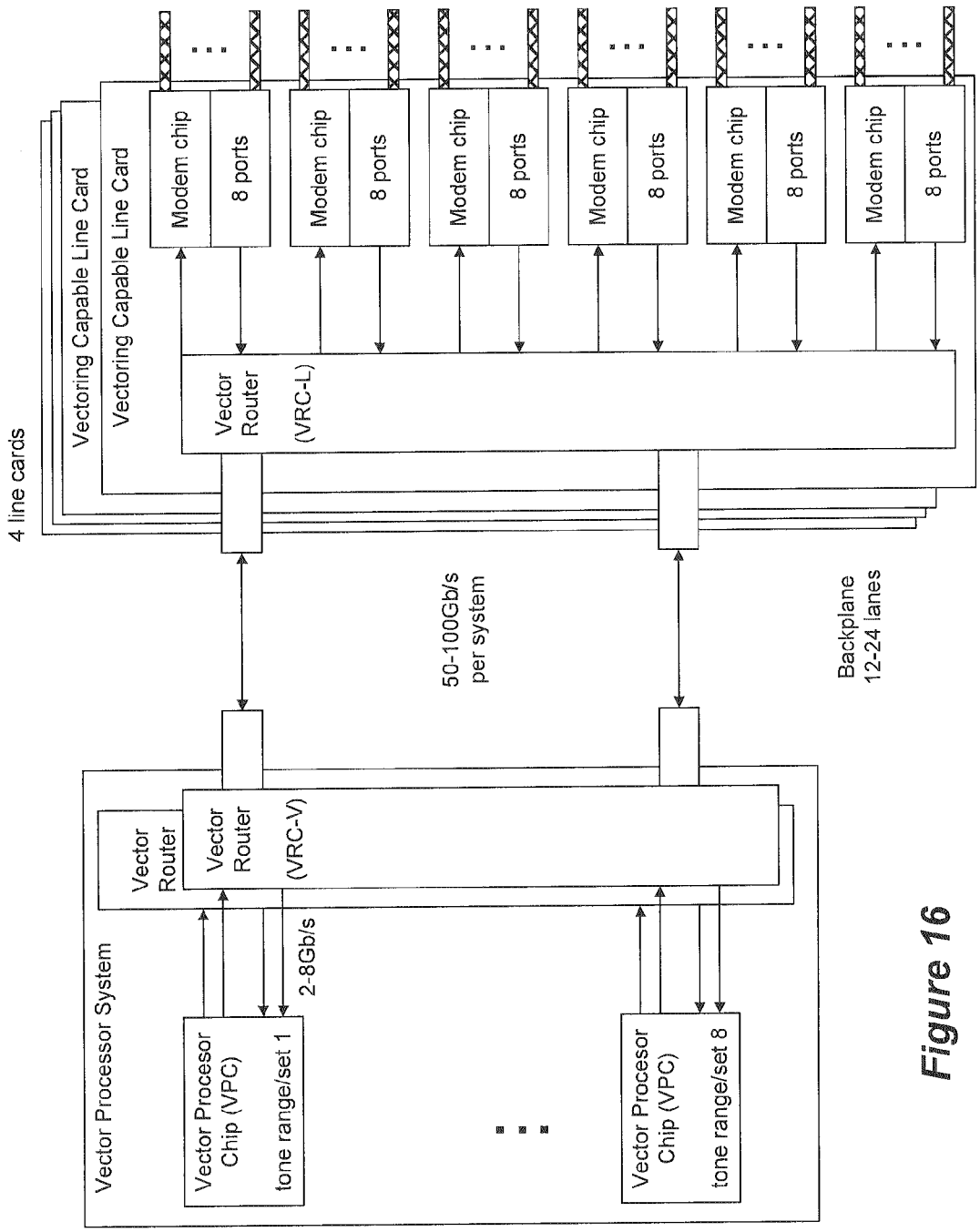
Figure 17:
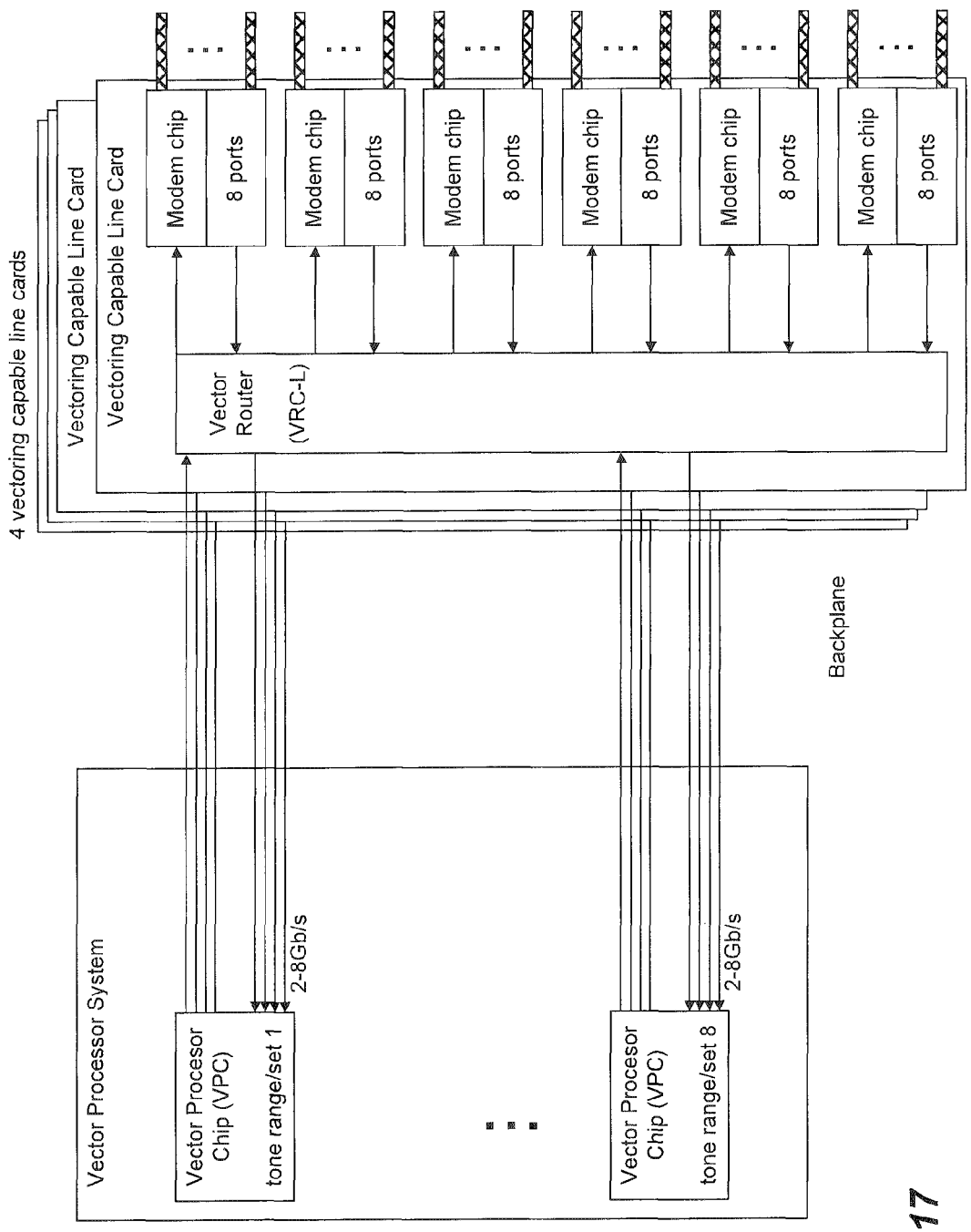
Figure 18:
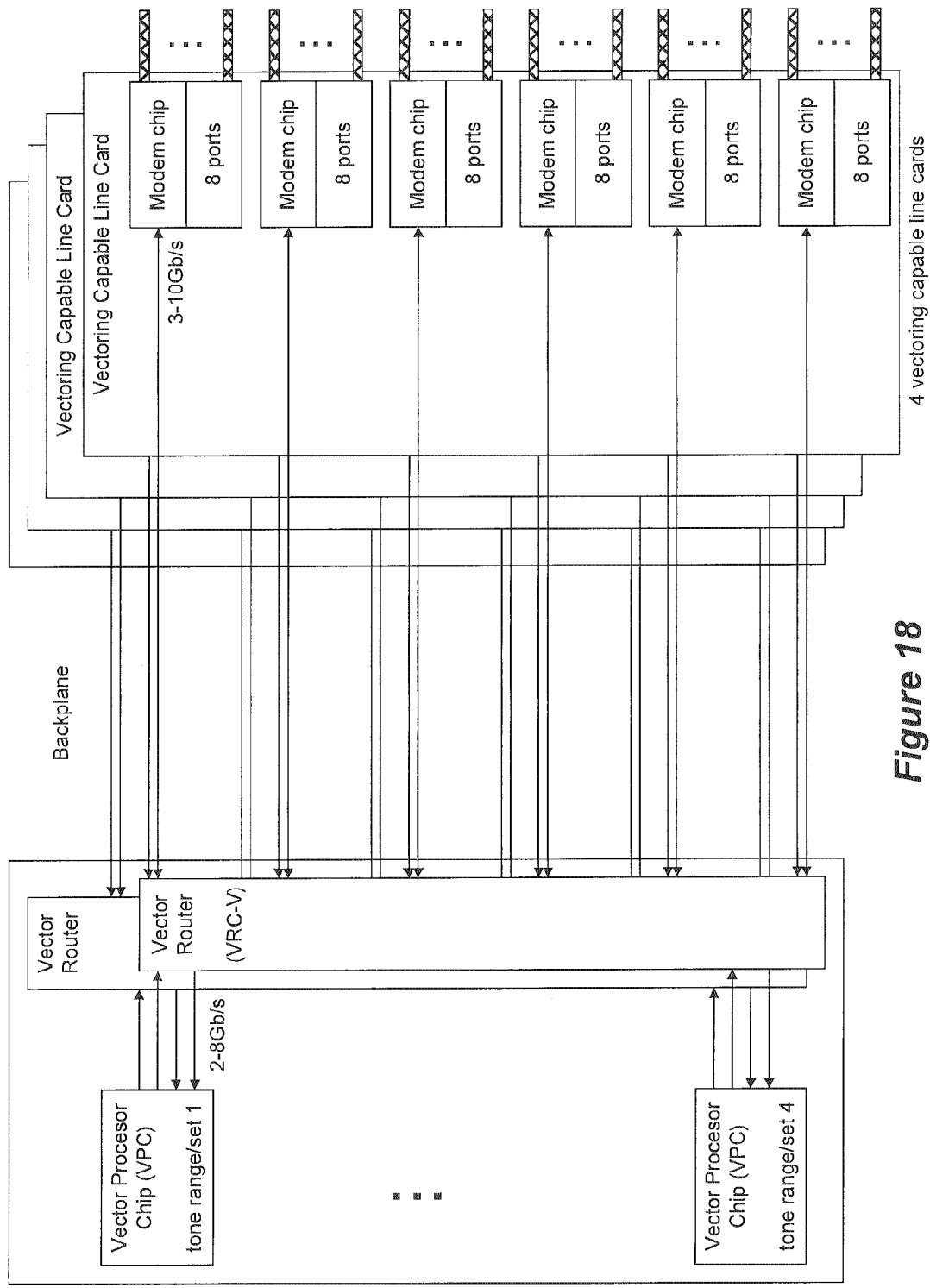
Figure 19:
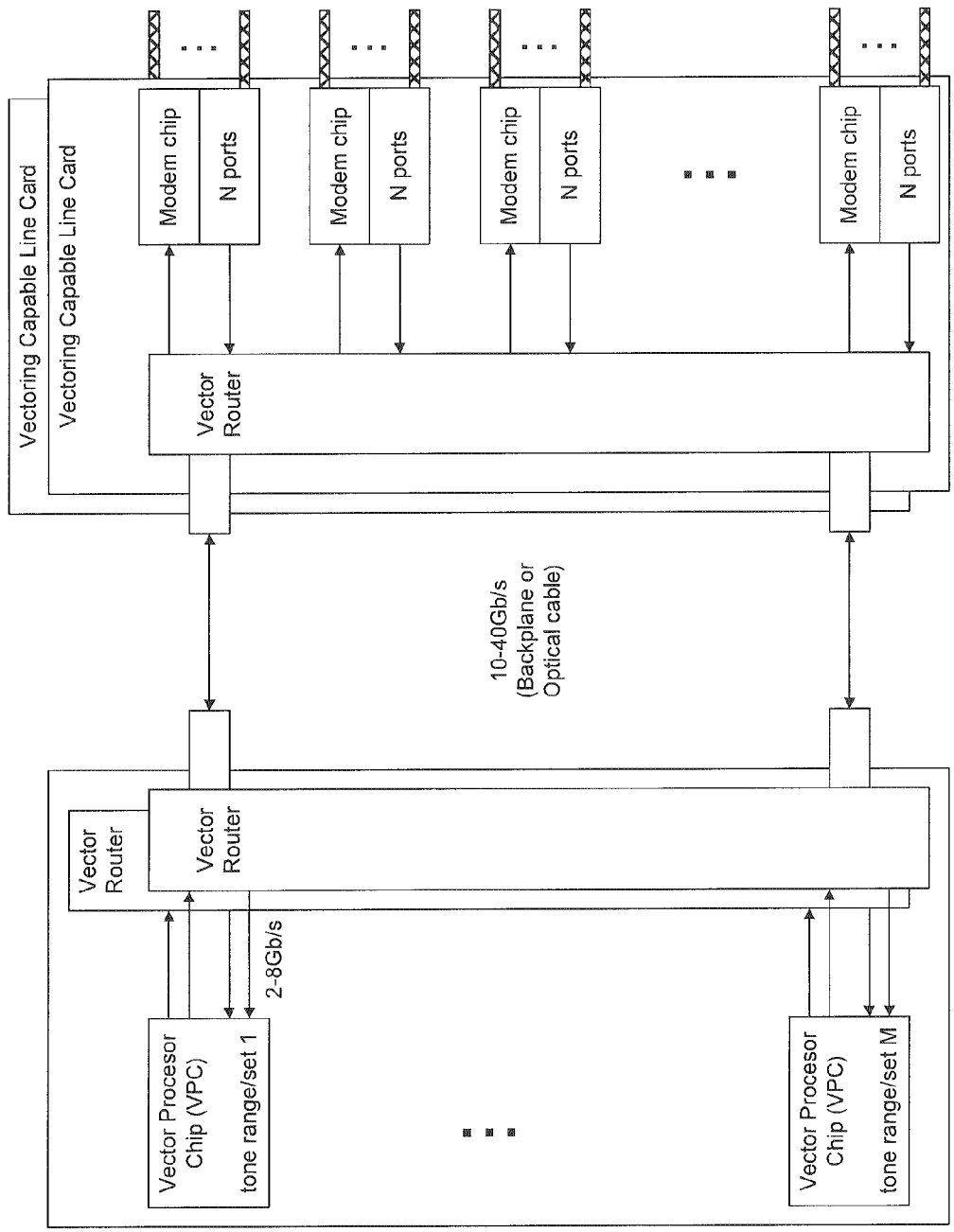

FIG. 15 illustrates one embodiment of a 48-port, single line card vectoring data communication system in which a single line card holds all modem ports, a vector router chip and any needed vector processing chips (here, 3 VPCs). The 48 ports are served in a relatively simple configuration and the system makes use of either copper backplane or optical cable communication to efficiently aggregate the FFT/IFFT data and interface between the line card and the vectoring card. FIG. 16 illustrates a multiple line card vectoring data communication system that serves 192 modem ports in an ITU 993.2 Profile 17a example. In the embodiment shown in FIG. 17, no VRC-V is required, so the VPUs communicate directly with each line card's VRC-L. Similarly, FIG. 18 shows an embodiment in which no VRC-L is required, and each modem chip communications directly with a VRC-V. In this embodiment, modem chips on the "front" two line cards communicate with the "front" VRC-V, while modem chips on the "back" two line cards communicate with the "back" VRC-V. FIG. 19 shows yet another embodiment. Exemplary system configurations are noted in Table 1:

TABLE 1

| ITU 993.2 Profile | Modem ports/chip | Modem chips/line card | Modem ports/line card | System line cards | System modem ports | System VRC-Vs | System VPCs |
|---|---|---|---|---|---|---|---|
| 8a | 12 | 4 | 48 | 4 | 192 | 2 | 6 |
| 12a | 12 | 4 | 48 | 4 | 192 | 2 | 8 |
| 17a | 12 | 4 | 48 | 4 | 192 | 4 | 8 |
| 30a | 8 | 3 | 24 | 4 | 96 | 4 | 6 |

The ITU 993.2 Profile 8a with 192 ports generates an estimated power dissipation of ~200 mW/port and 40 W for the total system (250 mW/port and 48 W for the 17a profile with 192 ports and 400 mW/port and 40 W for the 30a profile).

Figure 20:
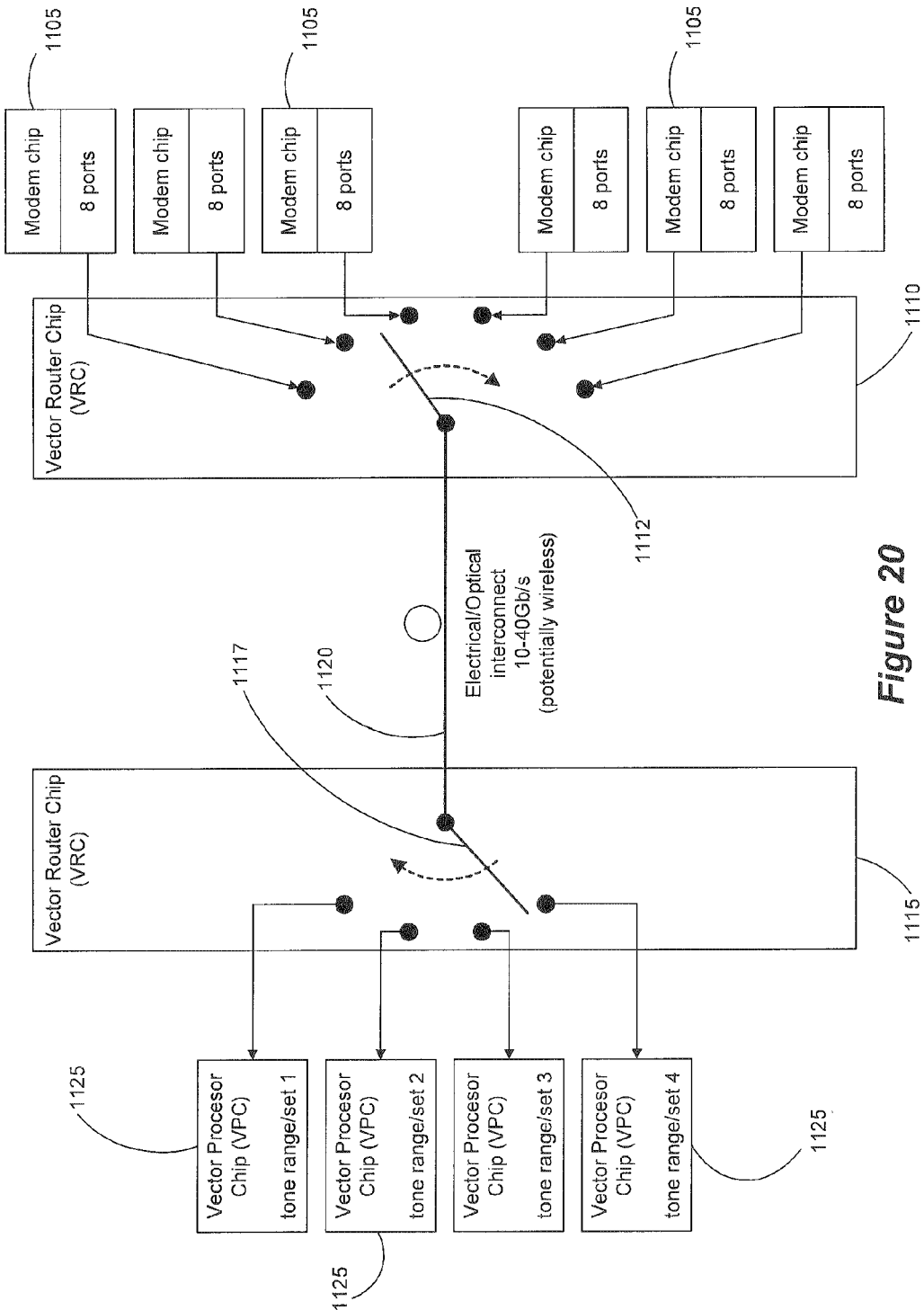
FIG. 20 is a block diagram showing an exemplary data transmission configuration for use in connection with one or more embodiments of the present invention.

FIG. 20 illustrates an embodiment of the present invention in which the vector router chips 1110, 1115 communicate data from six modems 1105 (the number of modems can vary as appropriate) to four VPCs 1125 (again, the number of VPCs can vary as appropriate) using a sweep-select 1112 to collect data from the modems 1105 and a sweep-distribution 1117 to distribute the collected data to the vector processor chips 1125. As seen in FIG. 20, the VRC-L 1110 is coupled to the VRC-V 1115 by a suitable interconnect 1120. The bus bandwidth used/needed/required can be determined in instance as follows:

Bandwidth=$n$Ports*(Data_Precision)*2*4 kHz in which "2" indicates complex arithmetic. Finally, bandwidth bottlenecks can be avoided using the "striping" shown in FIG. 20.

Figure 21:
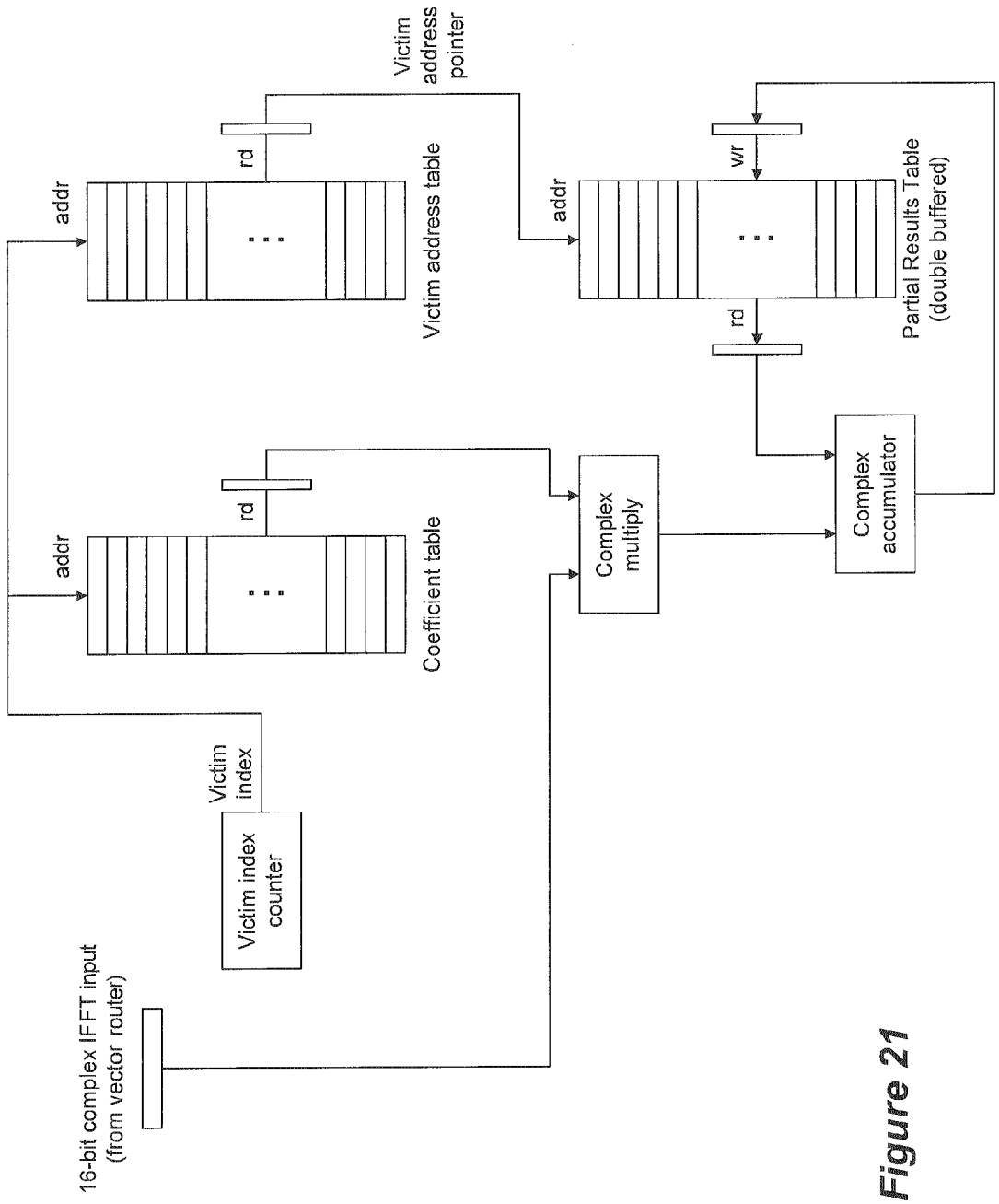
FIG. 21 is an exemplary logic implementation of a vector processor unit according to one or more embodiments of the present invention.

FIG. 21 illustrates one exemplary logic implementation of a vector processor unit. In this example, the sub-unit can process a single tone and traces the data path for a vector processor core according to one or more embodiments of the present invention. This exemplary VPU is capable of processing one DMT tone at a time. As IFFT/FFT samples from each modem arrive from the vector router, the VPU determines the list of "victim" modems that must be FEXT canceled for this disturber. Using pre-determined FEXT cancellation coefficients from the coefficient table and the victim address list, the impact of this disturber can be accumulated into the partial results table for each victim modem (partial result of the FEXT cancellation operation). After the full set of disturber data has been received from the vector router for this tone and FEXT cancellation has been completed, the partial results table will then contain the resultant vectored IFFT/FFT samples for the current DMT tone, and this vectored data in then sent back to the vector router for transmission back to the modem ports.

Figure 22:
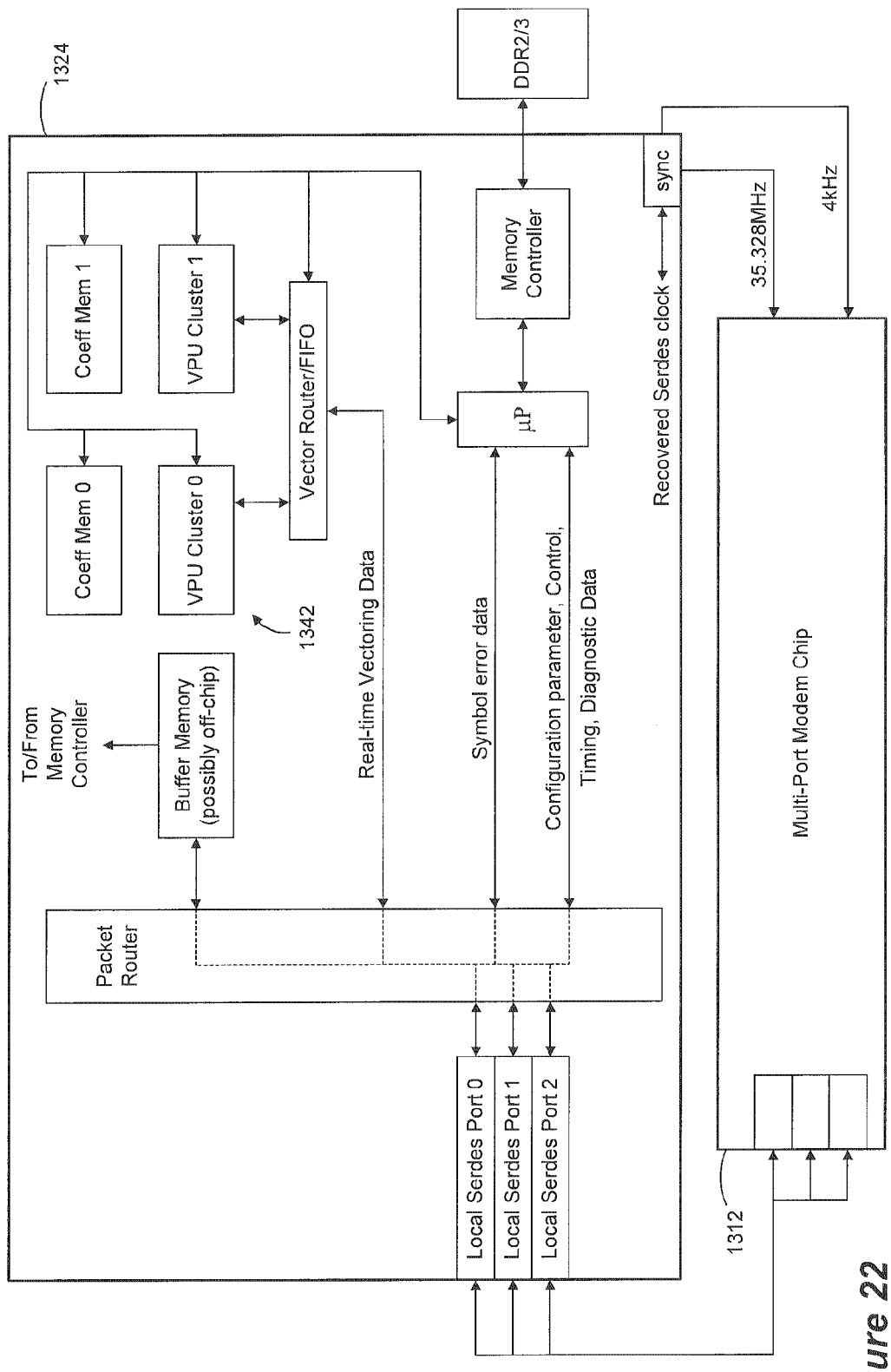
FIG. 22 is an exemplary vector processor implementing two VPUs and interfacing with at least one modem chip according to one or more embodiments of the present invention.
Figure 23:
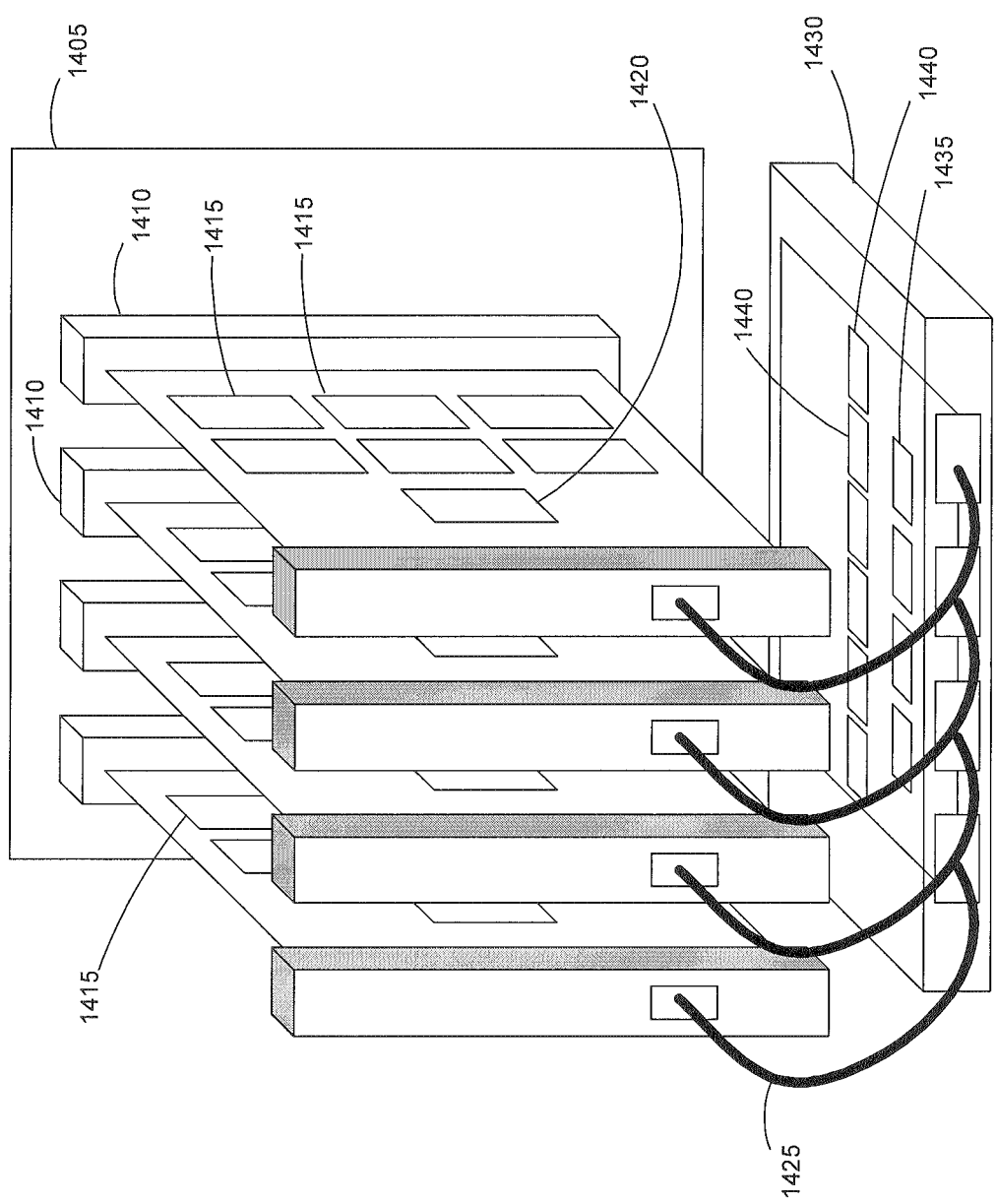
FIG. 23 is a DSLAM architecture embodiment showing a dedicated vectoring module with four line cards providing user data for vectoring.

FIG. 22 shows an exemplary vector processor 1324 implementing two VPUs 1342 and interfacing with at least one modem chip 1312. Vector processor 1324 could be implemented in some embodiments of the present invention on a single FPGA, ASIC, etc. connected to modem chip 1312 or the like. The vectoring data communication system of FIG. 23 illustrates a DSLAM architecture embodiment showing a dedicated vectoring module 1430 with four line cards providing user data for vectoring. Line cards 1410 are mounted to a chassis or the like 1405 and each line card includes several modem chips 1415 and a vectoring interface device 1420. Each interface device 1420 communicates via optical interconnect 1425 with the vectoring module 1430, which can be a pizza box or a line card. Each module 1430 contains a line card interface chip 1435 that corresponds to one of the interface devices 1420 on line cards 1410. A number of processing chips 1440 are available for vector processing of user data.

Figure 24:
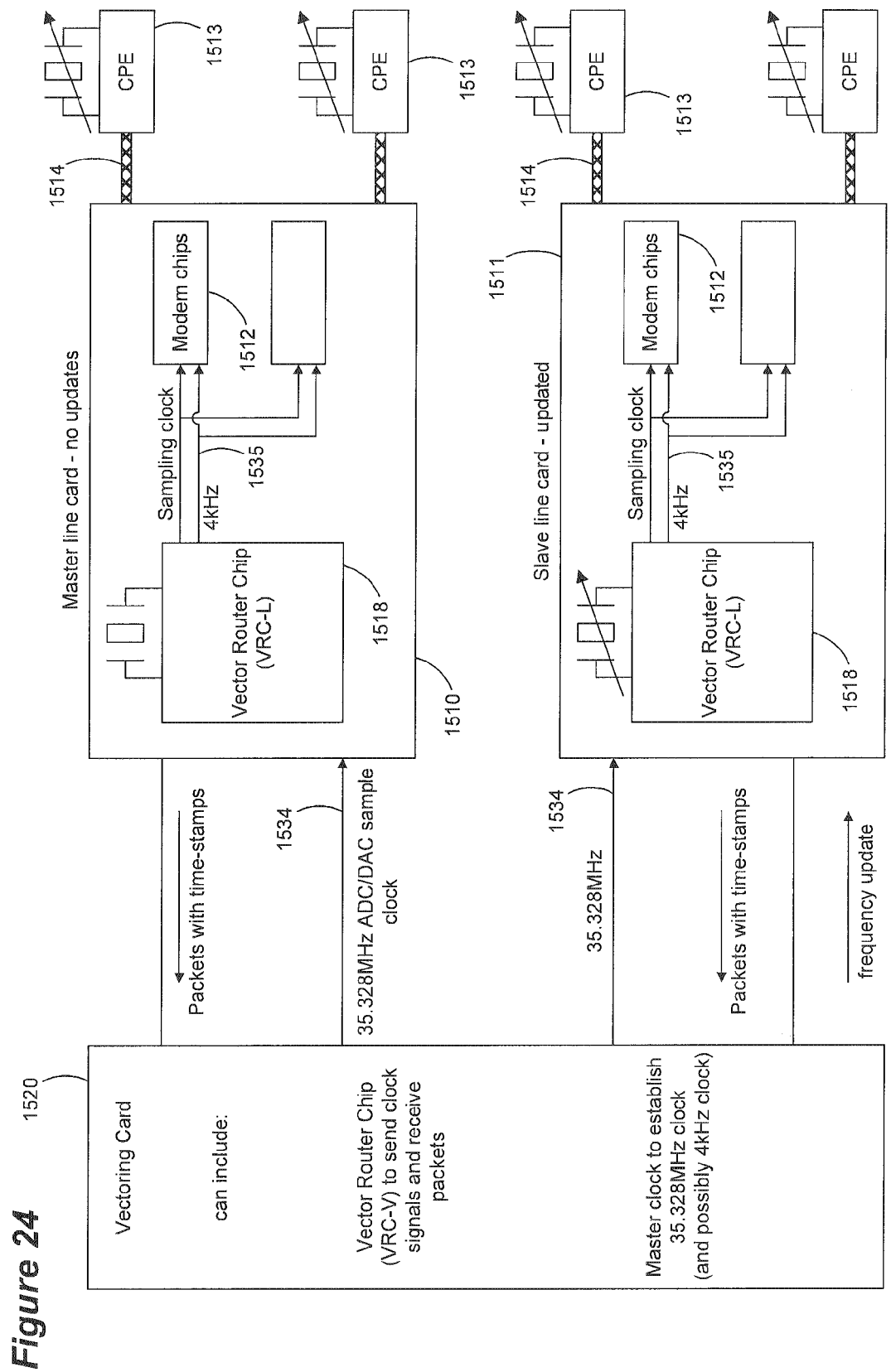
FIG. 24 illustrates clock synchronization of components in a vectored DSL system according to one or more embodiments of the present invention.

As illustrated in the system 1500 having a master line card 1510 and a slave line card 1511 in FIG. 24, in order for vectoring to work properly, all modems 1512 in the vector group must be synchronized to both an ADC/DAC sample clock 1534 and a DMT symbol clock 1535, shown as 35.328 MHz and 4 kHz, respectively. The DSLAM side modems 1512 are connected via DSL line 1514 to a number of customer-side DSL modems 1513. The high-speed sample clock is assumed to be distributed in some manner over a backplane or dedicated cable. The VRC-Ls 1518 can then phase lock to the high-speed sample clock and redistribute a low-noise sample clock to the modem chips 1517. In order to avoid sending a dedicated 4 kHz DMT symbol clock over the backplane or dedicated cable, it would be advantageous to use the high-speed communication interface intended to transmit vectoring data (XAUI or similar) to send timing information in data packets. The high-speed interface operates at a sufficiently high speed, that the approximate DMT symbol timing can be determined from such timing packets. As there is some tolerance to the exact DMT symbol timing (made possible, for example, by cyclic prefix and cyclic extension in the VDSL protocol), the VRC-L 1518 needs to determine only the approximate symbol timing provided that it will remain consistent thereafter (that is, synchronized to some fixed number of the high-speed sample clock periods).

A well-known result from Communication Theory (the Gap Approximation) is that the signal to noise ratio (SNR) needed for reliable communication as a function of the desired bit rate (with given assumptions for the margin and code in use) is that the SNR in dB must be at least three times the number of bits per tone, plus 9.88 dB, plus the desired margin, minus the coding gain in dB. Further, the maximum desired number of bits per tone is limited (e.g., 15 bits per tone by a standard such as G.993.2). The best SNR needed can be computed from the combination of these two facts (e.g., 57 dB in this example). This SNR can be referred to as a "bit-cap SNR." Also, a reasonable assumption for best-case, unavoidable background, thermal or other receiver noise likely to be present is −140 dBm/Hz.

Figure 25:
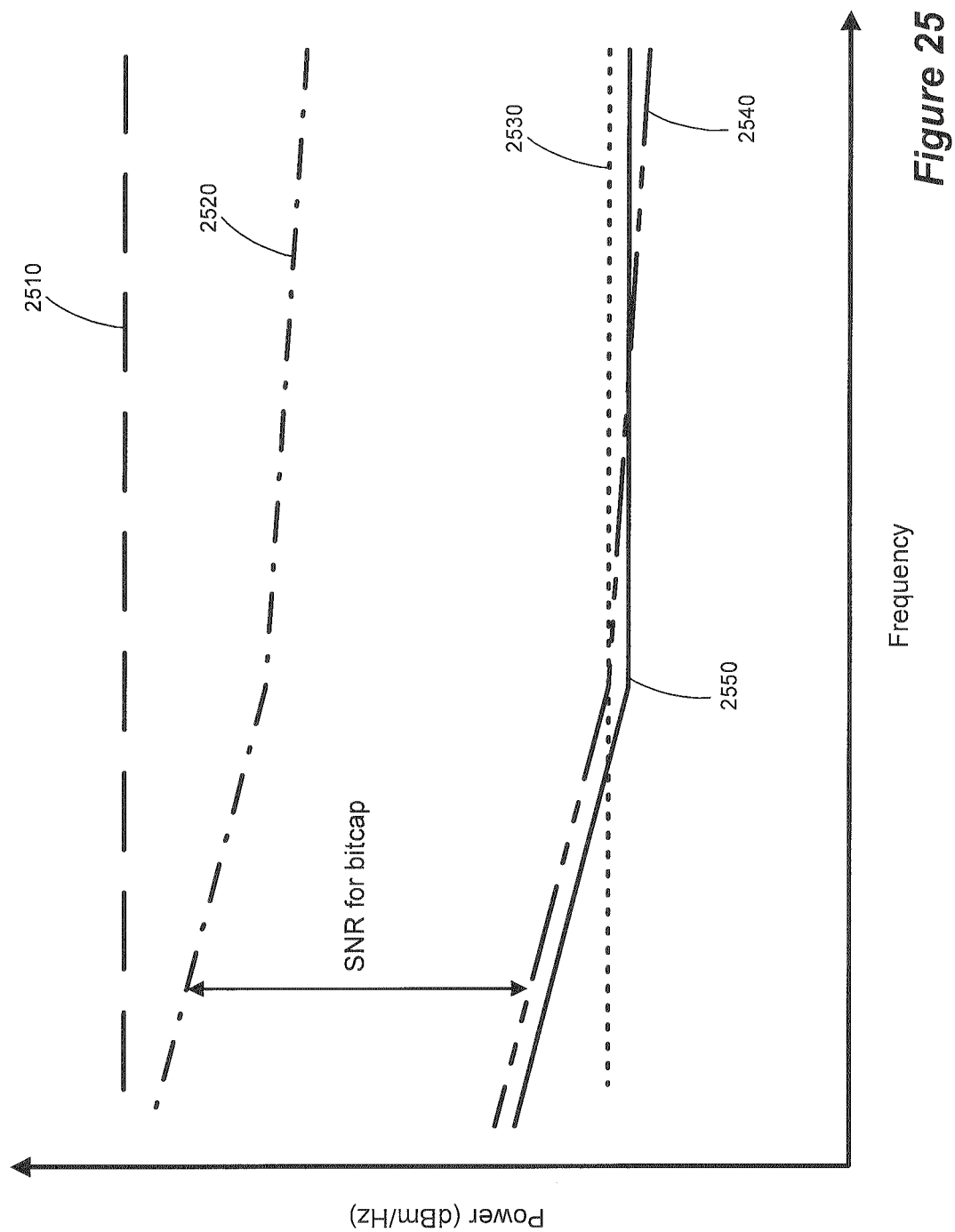
FIG. 25 illustrates exemplary power spectral densities of the transmit signal, FEXT, and background noise referred to CPE receiver.

Noise, quantization error, etc. at a transmitter is, in effect, attenuated by a lossy channel (twisted wire pair) before it is perceived at the receiver. Such transmitter impairments combine with receiver noise to generate a total transceiver-related impairment. Given the best SNR that will be needed, and recognizing the lowest likely receiver noise present, if the transmitter effects are suppressed to a level that is some fraction of the receiver noise (e.g., line 2550 of FIG. 25), they will be insignificant when compared to the receiver noise. FIG. 25 shows graphically exemplary transmit power spectral density (PSD) 2510, received PSD 2520 resulting from channel attenuation and best-case background noise floor $n_0$ 2530. For FEXT cancellation, suppression or mitigation of FEXT at the receiver below the unavoidable background noise $n_0$ 2530 achieves little further data rate benefit. Also, if the SNR is greater than the bit-cap SNR described above at some tone frequencies, then it there is insignificant data rate benefit to suppress or mitigate FEXT further.

Figure 26:
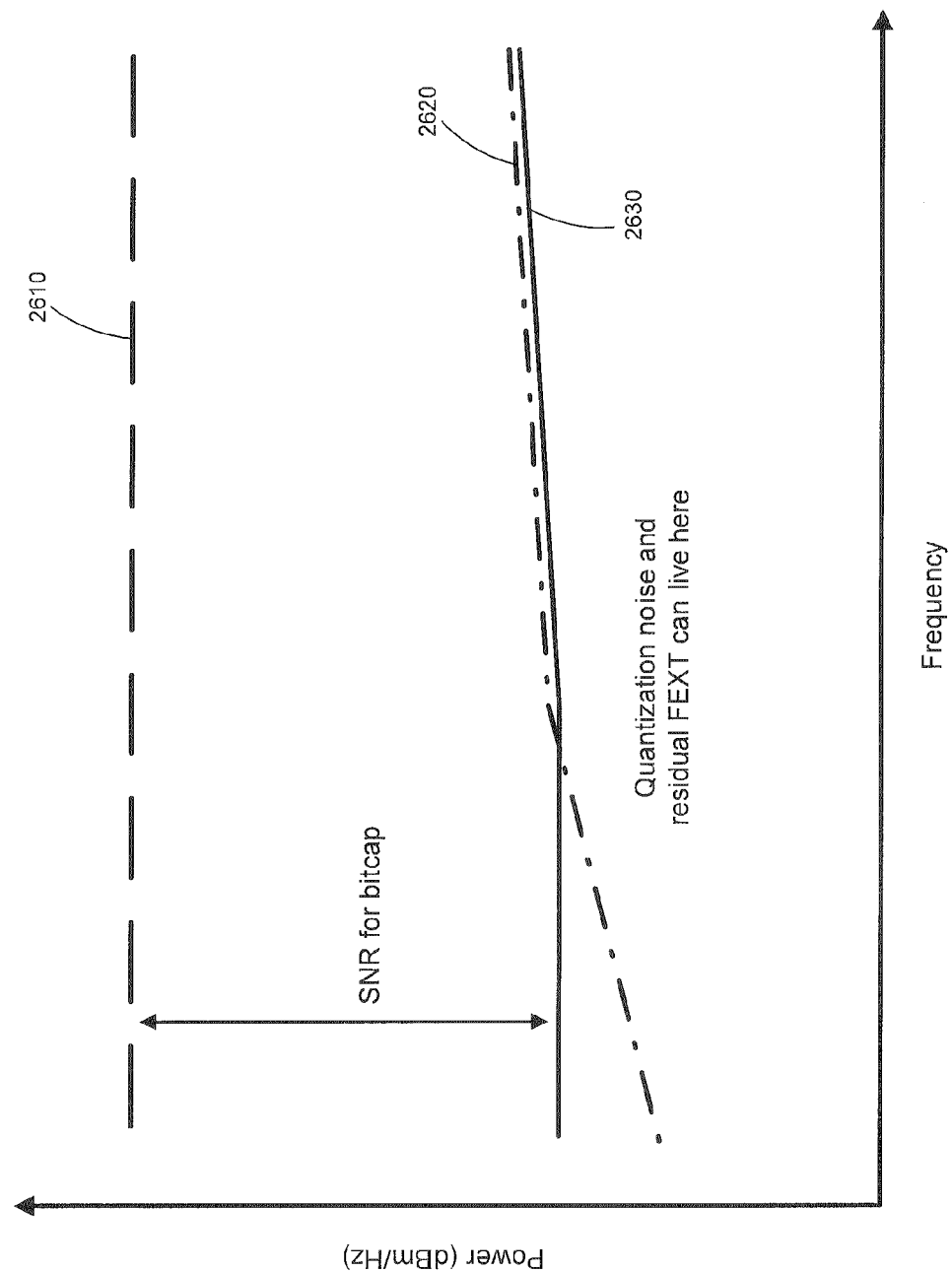
FIG. 26 is a diagrammatic representation of exemplary power spectral densities of transmit signal and allowable noise budget referred (scaled) to the transmitter.

A noise profile $n_1$ is computed to reflect the PSD of the allowable quantization error at the receiver, and this is given by the larger of (a) the background noise $n_0$ 2530 and (b) the bit-cap SNR subtracted from the received signal PSD (line 2540 in FIG. 25), or $n_1$=max ($n_0$, rxpsd−bitcapSNR)−margin. For downstream communication, allowable FEXT cancellation impairments are combined with other impairments in the transmitter, so it is more useful to scale $n_1$ so that it is referred to the transmitter; because the channel is linear, this can easily be done by multiplying (summing in dB) by the channel attenuation (shown schematically in FIG. 26, where the transmit PSD 2610, the receiver noise referred to the transmitter 2620 (i.e., receiver noise divided by the channel gain (transfer function)), and the bitcapSNR establish the allowable FEXT cancellation impairments threshold 2630):

$$n_2 = n_1 + atten(\text{dB})$$
$$= txpsd - \max(bitcapSNR, atten)$$

It is more useful for the next step to express allowable FEXT cancellation impairments as a Signal to Quantization Ratio (SQR), defined in terms of the noise profile $n_2$ as $SQR_v$=txpsd−atten−$n_2$. In the precoder/cancellation computation, for any victim output, the result of one inner product (where $w_i$ are the coefficients, and $d_i$ are the $n_d$ disturbers) is:

$$v = \sum_{i=1}^{n_D} w_i d_i$$

Assume quantization error $\Delta w_i$ in the coefficients so that $$v = \sum_{i=1}^{n_D} (\overline{w}_i + \Delta w_i)d_i = \sum_{i=1}^{n_D} \overline{w}_i d_i + \sum_{i=1}^{n_D} \Delta w_i d_i$$

The combined mean-square error $$E\left[\left(\sum_{i=1}^{n_D} \Delta w_i d_i\right)^2\right]$$

resulting from quantization is $$\sigma_v^2 = n_D \frac{\sigma_d^2 q_w^2}{12},$$

where the least-significant digit forms the quantization interval $q_w$ and is related to the word sizes by $q_w = 2^{1-n_w}$, and since the quantization error $\Delta w$ is uniformly distributed on an interval of size $q_w$, the variance of w is $E[\Delta w_i^2]=q_w^2/12$. Solving for the bit precisions needed, the resolution for the coefficients can be computed as a function of the number of disturbers, and the signal to quantization error ratio $$SQR_v = \frac{\sigma_d^2}{\sigma_v^2}$$

The resolution in bits, relative to unity for coefficients (per dimension)

$$n_w = 1 + \frac{1}{2}\log_2\left[\frac{2n_D \sigma_d^2}{12\sigma_v^2}\right] =$$
$$1 + \frac{1}{2}\log_2\left[\frac{2n_D}{12}\right] + \frac{1}{2}\log_2 SQR_v = 1 + \frac{1}{2}\log_2\left[\frac{2n_D}{12}\right] + \frac{SQR_v(\text{dB})}{6}$$

$SQR_v$ is then substituted with the value obtained from the calculation for the noise profile $n_2$.

In one example, $SQR_v$ could be 3 dB higher than the SNR needed to support 15 bits (i.e., 57 dB in the above-noted example), which would be about 60 dB (3·bitcapSNR+gap+ 3), so this comes out to 12.7 (13) bits for 64 disturbers. Thus the computed bit resolution needed for precoder coefficients reflects the maximum bit loading desired, best-case background noise and channel attenuation likely to be present. This, coupled with techniques described below, provides a process for choosing the memory required for coefficients based on system size (e.g., number of vectored lines or ports), target maximum data rate, and other transceiver parameters. It also can be used to obtain best performance given a total memory size.

As noted above, test signals received at a modem contain FEXT information in substantially all DSL system tones used by the receiving modem. FEXT data pertaining only to a subset of the tones in each microband is advantageously used in some embodiments to generate a FEXT channel approximation or other FEXT data (e.g., a tone subset obtained by using every $k^{th}$ sample for a positive integer k, via decimation). Discarded samples can be reconstructed so that their tones also benefit from vectoring. In such embodiments, where FEXT cancellation coefficients are used in pre-cancelling downstream FEXT, less bandwidth is needed for CPE modems or the like to return FEXT data upstream for vectoring—rather than sending FEXT data for all or substantially all DSL system tones (or all or substantially all downstream frequency band tones), only FEXT data for each microband's tone subset needs to be transmitted upstream to the DSLAM or other upstream-end device performing vectoring. The tone subset can be any appropriate data-reducing fraction of the total number of tones in a microband or other tone range (e.g., <50%, <25%, <10%, 4 tones per microband/range, 2 tones per microband/range, etc.) and other selection schemes are likewise available. In the upstream-end device, FEXT cancellation coefficient (or other FEXT data) approximation, smoothing, denoising, rounding, quantization and/or the like also reduces memory storage required for vectoring data (as well as bandwidth used, e.g. when a separate vectoring processing system is coupled to a DSLAM or to upstream modems and when FEXT data (e.g., error signals representing FEXT effects, FEXT channel response data, FEXT cancellation coefficients, etc.) are transmitted between vectoring processing apparatus and upstream modems or a DSLAM). Where upstream FEXT is involved, the downstream-to-upstream transmission bandwidth is not an issue because error signals are collected at the upstream-end DSL device, but FEXT data storage and upstream-end bandwidth usage nevertheless benefit substantially from some embodiments' approximation techniques.

Figure 27:
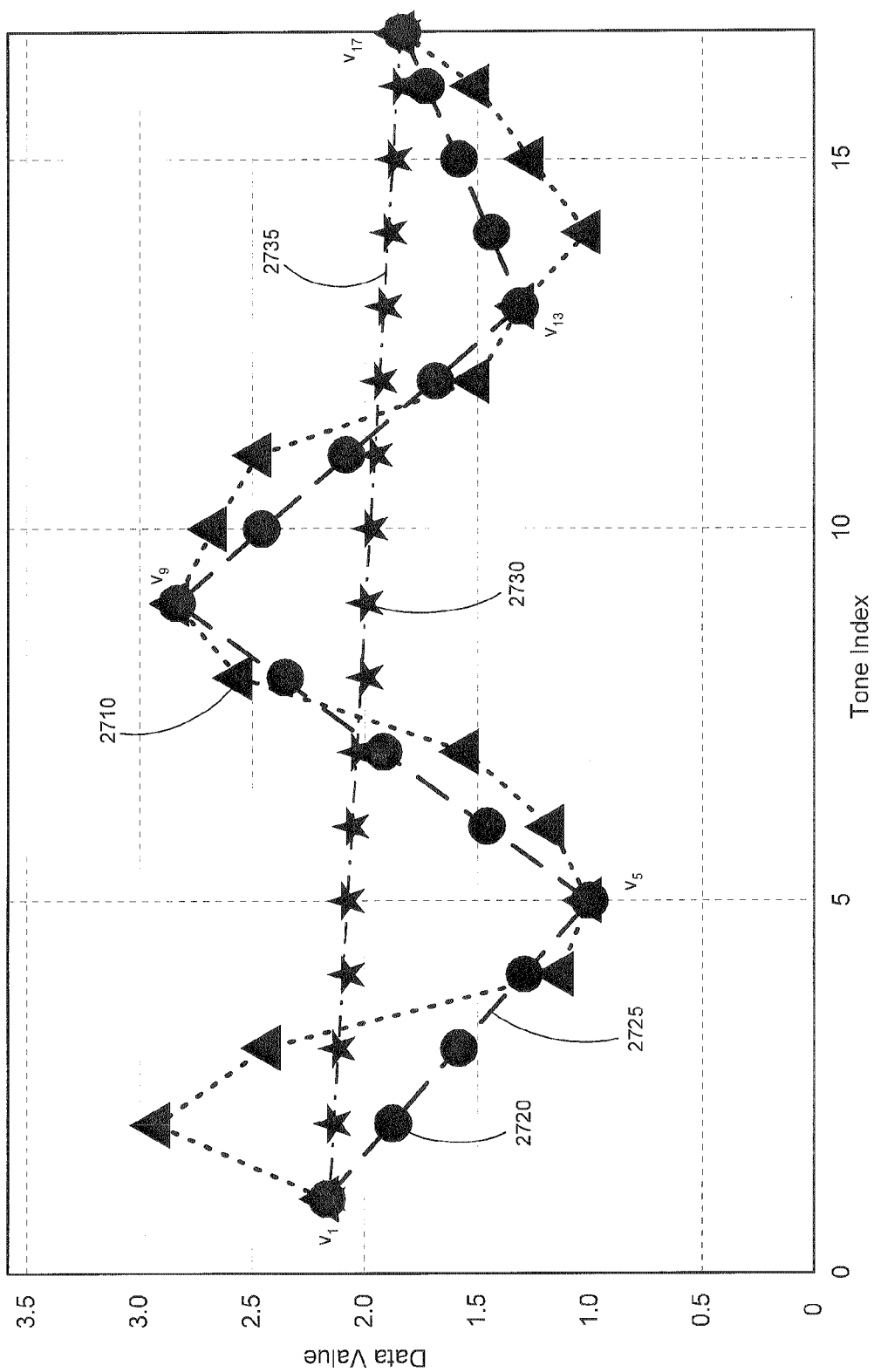
FIG. 27 illustrates one or more embodiments of piecewise linear approximation and least-squares regression approximation of a signal.

In some embodiments, FEXT data pertaining to the tone subset is used to generate a linear approximation of FEXT cancellation coefficients. Tones for which actual FEXT error signals are available are used to generate full-precision FEXT cancellation coefficients, while the tones not included in microband tone subsets use approximated cancellation coefficients. Various linear approximations can be used (e.g., piecewise linear approximation and least squares regression). Piecewise linear approximation approximates missing values using a line segment connecting two reported values adjacent to the missing values. Least squares regression approximates missing values using all reported tones in a microband. In particular, a single line is used to represent the entire microband, including the reported tones. The line is summarized/defined by its initial value and its slope value. These values are computed to minimize the least squares error between the reported tones and the values obtained by the linear approximation. Both methods are illustrated in FIG. 27, where tones 1-16 constitute a microband and samples of a signal of interest are taken at tones 1, 5, 9, 13 and 17 (denoted $v_1, v_5, \ldots, v_{17}$), the full set of values shown as points 2710. A piecewise linear approximation retains reported full precision values at tones 1, 5, 9, 13 and 17 and obtains values 2720 for tones 2, 3 and 4 using the values from a line segment 2725 joining values $v_1$ and $v_5$ (remaining values are obtained likewise). The least squares regression finds the initial value, b, and the slope value, s, that minimize $$\sum_{k=0}^{4} (b + 4ks - v_{4k+1})^2.$$

It then uses the approximation b+4ks for the data at tone 4k+1. Points 2730 are thus found as approximations on line 2735.

Some reduced-memory vectored DSL embodiments also use FEXT coefficient data smoothing, rounding, approximation, denoising, quantization, and/or the like, having two advantages. First, because measured data always includes some measurement error, prior FEXT characteristics knowledge can help remove some of this error. Second, denoising enables reduction in the size of data while maintaining a sufficiently accurate data approximation. In particular, FEXT coefficients can be filtered to remove components of the data that require large amounts of storage in a way that does not distort true coefficients significantly. The scope of smoothing, rounding, approximation, denoising, quantization, and/or the like methods is broad and many different methods can be used for this embodiment. One denoising example applies a linear filter to FEXT data to filter out higher frequency components, which helps make the data easier to compress using lossless methods (described below) because high frequency components are rare, requiring many bits to represent when using lossless coding.

Figure 28:
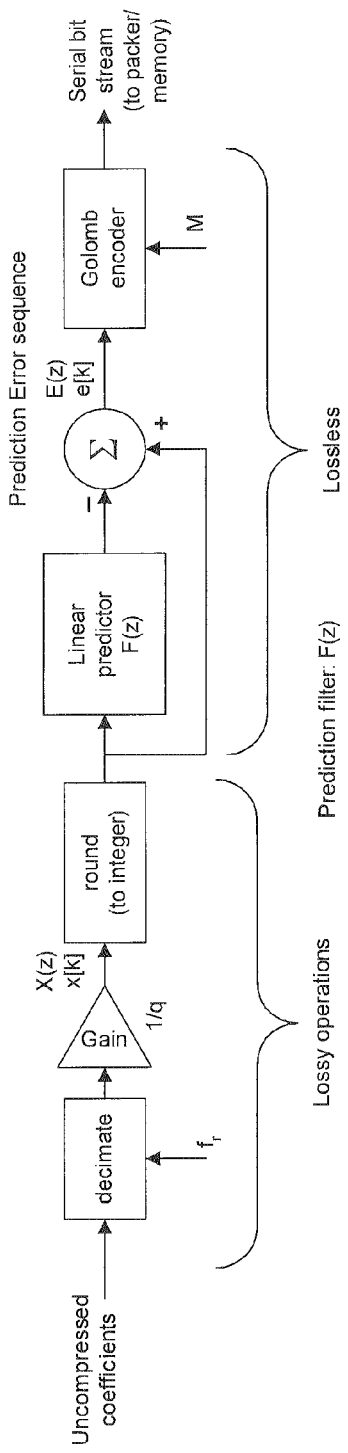
FIG. 28 is a block diagram of one or more apparatus and/or method embodiments of reduced-memory vectored DSL showing FEXT data and/or coefficient compression.
Figure 29:
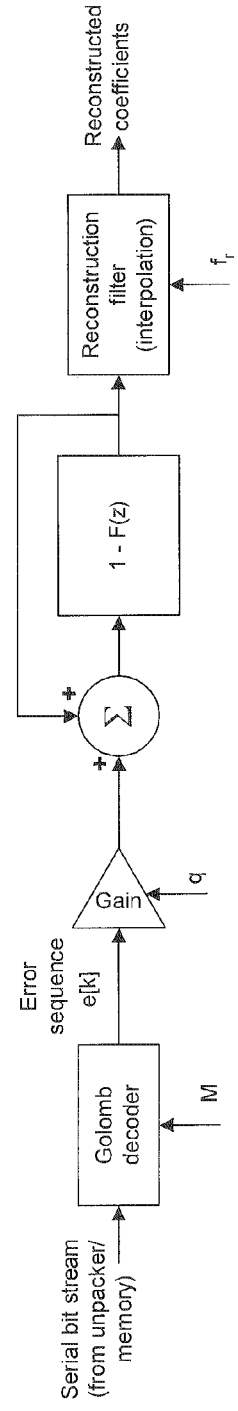
FIG. 29 is a block diagram of one or more apparatus and/or method embodiments of reduced-memory vectored DSL showing FEXT data and/or coefficient decompression.

A good prediction filter embodies the correlation of samples while the prediction error sequence is uncorrelated, which helps reduce the amount of information needed to describe each element of an output sequence. The filter must be invertible so that the original input sequence can be determined. FIG. 28 shows an example of how linear prediction used in both apparatus and method embodiments. A filter with integer coefficients, [1 −1], is simple and effective and enables reconstruction with reasonable complexity. This corresponds to encoding the input sequence x(1), x(2), ... x(n), as x(1), x(2)−x(1), x(n)−x(n−1), hence the term "differential encoding." Decoding inverts this process, processing the decoded error sequence by the prediction filter inverse (which is accumulation) to yield the original input sequence, as shown in FIG. 29.

Some embodiments quantize FEXT coefficients to lower precision, thus incurring a performance loss. This loss is mitigated because performance does not improve much once FEXT power is below certain unavoidable noise sources (e.g., thermal noise power at a receiver). Because the SNR is lower at higher frequencies, the unavoidable noise becomes more significant relative to the FEXT power, meaning that more FEXT can be tolerated while maintaining acceptable performance. Thus, the coefficients can be quantized to fewer bits than at lower frequencies and some embodiments allow quantization to vary for different spectrum segments including but not limited to using decreasing numbers of bits to represent the FEXT coefficients with the frequency. One way to perform variable quantization is to express the data as the product of a mantissa and the number 2 raised to some exponent, then to round the mantissa and the exponent to some predefined number of bits based on unavoidable noise on the tone whose value is being quantized (i.e., "mantissa-exponent quantization"). A single exponent is defined and allocated a fixed number of bits for each of the mantissa and exponent per microband for each off-diagonal term in the coefficient matrix. Since diagonal terms are usually fixed at 1, their exponent can be fixed at 0 (e.g., for a tone in DS1, the mantissa can be quantized to 8 bits and the exponent to 4 bits; for DS3 the mantissa can be quantized to 6 bits and the exponent to 4 bits).

In other embodiments a variation of a FEXT cancellation coefficient set for a victim/disturber pair is expressed as a set of linear segments that each correspond to a microband. Each line segment is encoded as an initial value (a coefficient value at one tone) and a slope that is proportional to the average change in coefficients over that microband's tone range. The initial value and the slope value may be obtained by various methods (e.g., linear regression). Coefficient reconstruction for use in cancellation uses the combination of initial value, slope value and tone index within the microband to derive an increment applied to the initial value to obtain the value for the tone in question.

Other embodiments related to linear regression and interpolation process the initial value and slope value together according to mantissa-exponent quantization. The exponent is derived by inspecting the absolute value of the real and imaginary parts of both of the initial value and the slope value.

FEXT data is further compressed in other embodiments using a lossless compression method (e.g., arithmetic coding, Huffman coding, Golomb coding). Such techniques are well known and are explained in more detail in the following, all of which are incorporated by reference herein for all purposes: "Arithmetic coding," by J. J. Rissanen and G. G. Langdon (IBM Journal of Research and Development, Vol. 23, No., 2, pp. 149-162, March 1979; "Arithmetic Coding for Data Compression," by Ian H. Witten, Radford M. Neal and John G.

Cleary (Communications of the ACM, Vol. 30, No. 6, pp. 520-540, June 1987); "A Method for the Construction of Minimum-Redundancy Codes" by D. A. Huffman, Proceedings of the I.R.E., pp. 1098-1102, September 1952; "Run-length encodings," IEEE Transactions on Information Theory, Vol. 12, No. 3, pp. 399-401, 1966. Arithmetic and Huffman coding are computationally complex due to the need to keep a code table readily accessible to all encoders and decoders. Golomb coding is computationally simpler and works well with the data because the distribution of values is peaked at its mean and decays sharply away from its mean.

The Golomb code requires mapping inputs to positive integers for coding and specifying parameters. First, the input alphabet is mapped to a set of positive integers. Since the input alphabet has a distribution that is centered about its mean of 0, a good mapping (1) rounds input values to b bits (where b is some integer depending on the desired number of quantization bits allocated for the mantissa), (2) multiplies by $2^b$ to get integer values, then (3) maps these values to positive integers by mapping x as y=2x for nonnegative x and y=−2x−1 for negative x. Next, Golomb coding requires that the positive integer being encoded be divided by a modulus, M, which typically is a power of 2 (known as Golomb-Rice coding). The result of this operation is two numbers: the quotient and the remainder, encoded separately using two methods and sent or stored consecutively. The quotient is encoded in unary form (i.e., a variable length format in which the value of the quotient is expressed by the duration in clock cycles of a pulse composed of 1's terminated by a ZERO), the length of the unary-coded portion is thus one plus the value of the quotient. The remainder is coded by its binary representation of length $\log_2(M)$ bits.

Golomb and other coding methods compress sequences of integers by assigning short codewords to the most frequent integers, and longer codewords to rare ones, thereby achieving length reduction of the coded sequence. Some embodiments extend this to sequences of complex numbers formed of integer real and imaginary parts (e.g., like those used to identify FEXT cancellation coefficients). In such embodiments, a mapping is made from complex number to positive integer so that the most frequent complex numbers in the source sequence are assigned to the smallest positive integers. Golomb coding requires a mapping to convert negative integers to positive; conventionally, positive integers are mapped to positive even numbers, while negative integers are mapped to positive odd numbers.

As noted above, many crosstalk cancellation coefficients are zero, and complex quantities with small absolute magnitude are much more frequent than large ones. The two-dimensional sequences may be coded independently, neglecting the correlation between the dimensions, but this requires more memory than embodiments disclosed herein. Instead, complex (two-dimensional) sequences of integer real and imaginary parts are coded by treating the parts independently so that the lengths of the coded sequences are determined by the statistics of the parts. If the real and imaginary parts are correlated, the sequence can be coded to a shorter length by jointly coding on the complex quantities. A mapping between complex numbers to positive integers reflects the frequency of occurrence of the complex numbers and assigns the shortest codewords to the most frequent symbols (which can be extended further to more than two dimensions simply).

One embodiment of encoding can be exemplified using a source sequence containing only the nine symbols {0, −1, +1, −j, +j, 1+j, −1−j, −1+j and 1−j}, the frequency of occurrence is in the order given, with 0 being the most frequent. One possible assignment of codewords would be (assuming the Golomb code modulus M=1)

TABLE 2

| Input symbol | Positive integer | Codeword |
|---|---|---|
| 0 | 0 | 0 |
| +1 | 1 | 10 |
| −1 | 2 | 110 |
| +j | 3 | 1110 |
| −j | 4 | 11110 |
| 1 + j | 5 | 111110 |
| 1 − j | 6 | 1111110 |
| −1 + j | 7 | 11111110 |
| −1 − j | 8 | 111111110 |

For each input symbol, the corresponding positive integer is obtained by looking up in the coding table. The positive integers that result from the mapping are Golomb coded in the normal way in prior art. Decoding is the reverse of encoding; the coded binary sequence that results from Golomb coding is decoded to a sequence of positive integers. These numbers are used as pointers into the coding table to get the original complex symbols. From this example, if the complex sequence is encoded as independent parts (dimensions), the coding table would be in Table 3 below.

TABLE 3

Coding table.

| Input symbol | Real | Imaginary | codewords |
|---|---|---|---|
| 0 | 0 | 0 | 0, 0 |
| +1 | 2 | 0 | 110, 0 |
| −1 | 1 | 0 | 10, 0 |
| +j | 0 | 2 | 0, 110 |
| −j | 0 | 0 | 0, 0 |
| 1 + j | 2 | 2 | 110, 110 |
| 1 − j | 2 | 1 | 110, 10 |
| −1 + j | 1 | 2 | 10, 110 |
| −1 − j | 1 | 1 | 10, 10 |

Now suppose that the relative frequency of occurrence of the complex symbols is as shown in the following Table 4.

TABLE 4

Computation of average coded length using conventional method.

| Input symbol | codeword length | frequency of occurrence | average length |
|---|---|---|---|
| 0 | 2 | 0.80 | 1.6 |
| +1 | 4 | 0.07 | 0.28 |
| −1 | 3 | 0.04 | 0.12 |
| +j | 4 | 0.01 | 0.04 |
| −j | 2 | 0.02 | 0.04 |
| 1 + j | 6 | 0.03 | 0.18 |
| 1 − j | 5 | 0.01 | 0.05 |
| −1 + j | 5 | 0.01 | 0.05 |
| −1 − j | 4 | 0.01 | 0.04 |
| | | 1 | 2.4 bits/symbol |

TABLE 5

Average length of coded symbol.

| Input symbol | codeword length | frequency of occurrence | average length | |
|---|---|---|---|---|
| 0 | 1 | 0.80 | 0.80 | |
| +1 | 2 | 0.07 | 0.14 | |
| −1 | 3 | 0.04 | 0.12 | |
| +j | 4 | 0.01 | 0.04 | |
| −j | 5 | 0.02 | 0.10 | |
| 1 + j | 6 | 0.03 | 0.18 | |
| 1 − j | 7 | 0.01 | 0.07 | |
| −1 + j | 8 | 0.01 | 0.08 | |
| −1 − j | 9 | 0.01 | 0.09 | |
|  |  | 1 | 1.62 | bits/symbol |

Using this method in Table 5 thus reduces the average length from 2.4 to 1.62 bits/symbol.

Figure 30:
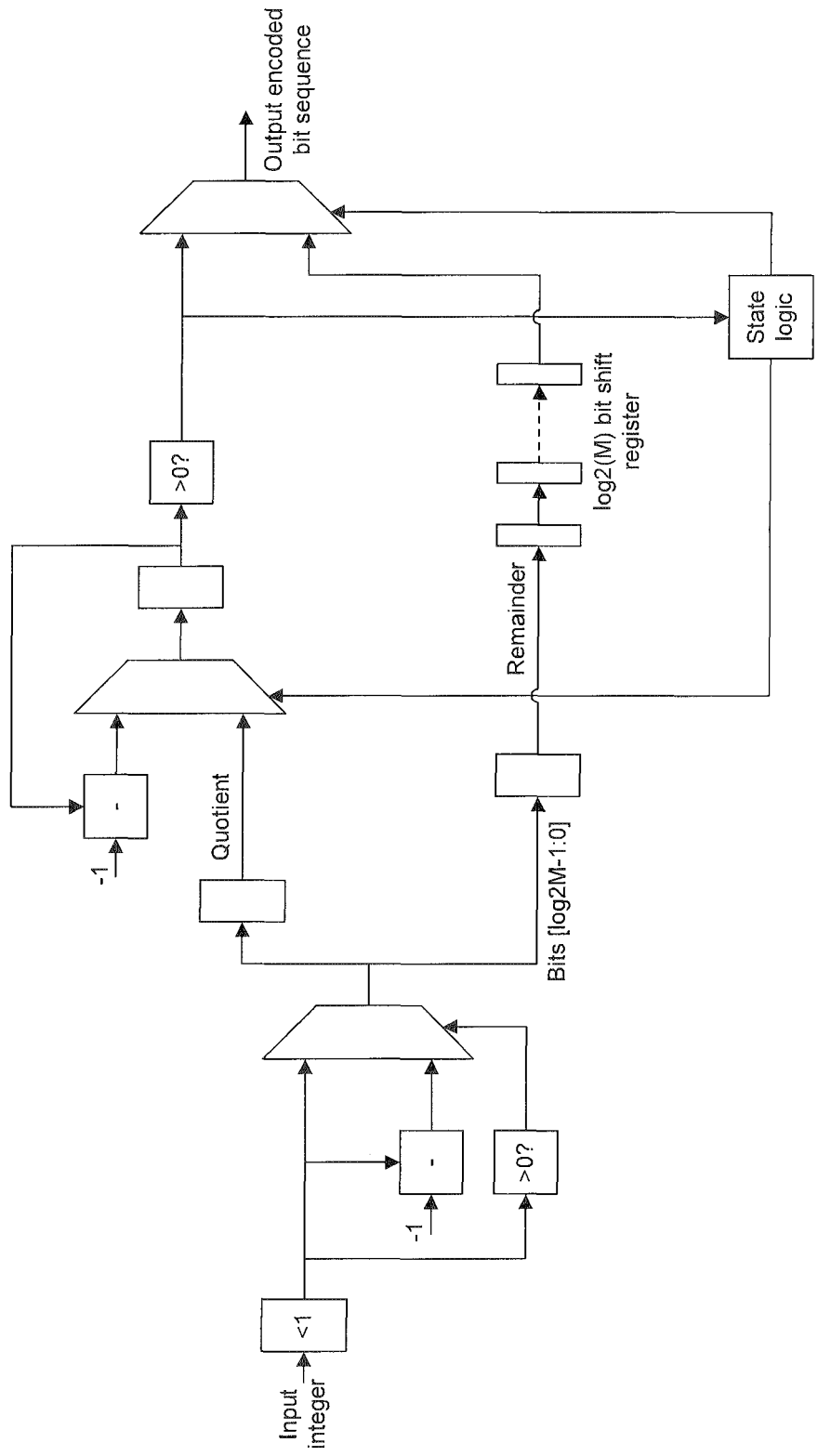
Figure 32:
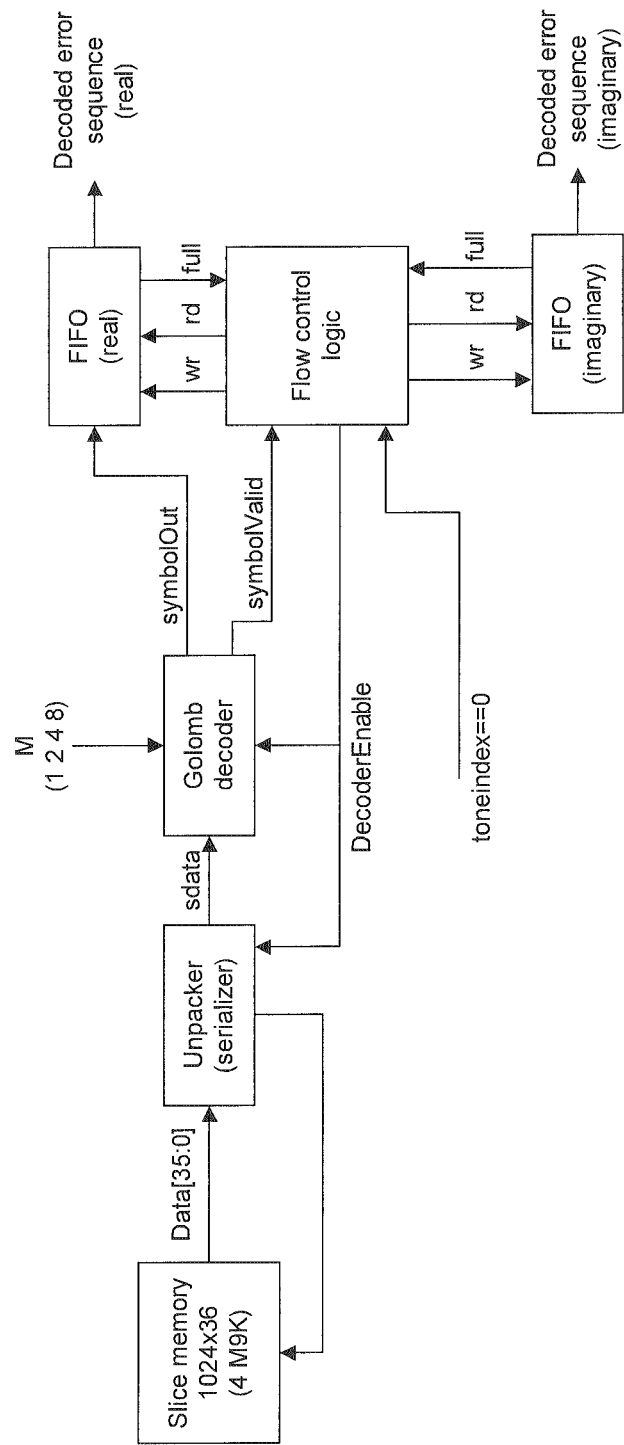
FIG. 32 illustrates one or more apparatus and/or method embodiments of reduced-memory vectored DSL showing FEXT data and/or coefficient decompression.

One implementation of this is shown in FIG. 30, and a software code embodiment in FIG. 31. The decoder operates in one of two states (UNARY or BINARY), starting in UNARY state with the reading of the first bit of the input sequence, and remaining in that state while 1's are received and counted as the quotient by an accumulator until the first ZERO is received. When first ZERO arrives, the decoder transitions to BINARY state and proceeds to receive $\log_2(M)$ more bits as the remainder. The quotient is multiplied by M (equivalent in digital logic to shifting left by $\log_2(M)$ bit positions) and then added to the remainder. Lastly, the positive integer is converted back to a signed integer by the reverse of the mapping described above. In the BINARY state, once the $\log_2(M)^{th}$ bit has been received in that state, the state transitions to UNARY state and the decoded symbol may be indicated as valid.

In some embodiments a block of FEXT coefficients pertaining to one victim/disturber pair is transformed according to the Discrete Cosine Transform. Since the FEXT coefficients started out as frequency-domain components, the transformed block can be thought of as a set of time domain components. A consequence of the correlation in the frequency-domain is that the transformed components are confined (i.e., the most significant components are grouped together), meaning that insignificant components can be discarded with minimal information loss. This can be done using an adjustable threshold parameter t such that for higher values of t, more information is lost and thus the remaining information can be stored with less memory. Further, since these quantities will be stored digital form, this implies some quantization that may further reduce the amount of information. This approach can be combined with lossless (entropy) coding described above for further reductions in memory requirements. Reconstruction to obtain canceller coefficients at every tone involves decompression of the entropy coding (if used), padding the length of the decoded sequence with zeros so that there are as many elements of this sequence as there are tones corresponding to the block, and computing the inverse Discrete Cosine Transform.

In some embodiments the amount of memory for coefficient storage and/or bandwidth for transmission may be limited. Techniques described above for compressing FEXT coefficients result in a reduced amount of information—however, the amount may not be known until after compression is started. It is possible that there is insufficient memory (e.g., to store coefficients for all disturber/victim combinations, or for all microbands used). Several adjustable parameters (e.g., quantization interval q, reconstruction sub-sampling rate $f_r$, transform coding threshold t) can influence the size and fidelity (corresponding to eventual residual FEXT) of the resulting FEXT canceller or precoder. Derivation of FEXT coefficients necessarily involves an iterative process (to reduce measurement noise by time-averaging). Possible memory overflow can be prevented using initial parameter settings that generate the most information loss, and hence guarantee that initial compression attempts fit into available memory. The next iteration adjusts the parameters to increase the fidelity of the FEXT coefficients and thereby reduce residual FEXT, which also increases memory requirements. This process is repeated until reaching a preselected or predetermined limit (before overflow), then terminated, the termination condition representing optimal residual FEXT in light of available memory.

In embodiments using lossless entropy coding, compressed coefficients must be decompressed before an update can be applied, then the result re-compressed before storage. If linear prediction or transform coding is used in addition, the linear prediction filter or transform is applied to the update, and this transformed update applied to the decompressed coefficients by adding it to the decompressed coefficients. It is unnecessary to apply the inverse linear prediction filter to the decompressed coefficients, add the update and then apply the linear prediction filter. The above technique thus saves computation time and resources by avoiding the use of the inverse linear prediction filter.

As will be appreciated from the descriptions of the various embodiments above, sampling/decimating/discarding tone data, approximate reconstruction of tone data, denoising, approximation, smoothing, rounding, quantization, prediction, variable quantization and/or lossless coding techniques can be combined in other vectored DSL systems and operations.

Many features and advantages of the invention are apparent from the written description, and thus, the appended claims are intended to cover all such features and advantages. Further, numerous modifications and changes will readily occur to those skilled in the art, so the present invention is not limited to the exact operation and construction illustrated and described. Therefore, described embodiments are illustrative and not restrictive, and the invention should not be limited to the details given herein but should be defined by the following claims and their full scope of equivalents, whether foreseeable or unforeseeable now or in the future.

What is claimed is:

1. A method for operating a vectored VDSL line group comprising a plurality of VDSL lines, each VDSL line comprising a DSLAM coupled to customer premises equipment (CPE), the plurality of VDSL lines comprising a first VDSL line comprising a first CPE coupled to the DSLAM, the method comprising:

transmitting test signals from the DSLAM to the first CPE;

the first CPE receiving test signal output data based on the test signal input data;

the first CPE collecting decimated test signal output data for a subset of DSL tones in each of a plurality of DSL tone microbands, wherein each DSL tone microband contains a plurality of DSL tones in a DSL tone frequency band used for downstream transmission of data on the first DSL line, and further wherein each DSL tone subset contains not more than four DSL tones in each microband;

the first CPE transmitting the decimated test signal output data to the DSLAM;

generating quantized FEXT data from the decimated test signal output data by smoothing the decimated test signal output data to reduce measurement errors and/or to reduce the precision of the decimated test signal output data;

generating losslessly coded FEXT data from the quantized FEXT data by applying a linear predictor to the quantized FEXT data and thereafter applying Golomb coding;

generating FEXT cancellation coefficients based on the losslessly coded FEXT data; and a vectoring control entity (VCE) of the vectored VDSL line group performing vectored DSL processing for the vectored VDSL line group based on the FEXT cancellation coefficients.

2. The method of claim 1 further comprising updating the FEXT cancellation data.

3. The method of claim 1 further comprising:
storing the losslessly coded FEXT data in a memory apparatus coupled to the vectored VDSL line group and coupled to the VCE;
losslessly decoding the losslessly coded FEXT data; and
generating reconstructed FEXT cancellation coefficients form the decoded FEXT data.

4. The method of claim 1 wherein generating FEXT cancellation coefficients is performed by at least one of the following: the VCE; a computer coupled to the VCE; a DSLAM.

5. The method of claim 1 wherein the VCE is implemented on a first chip and further wherein the losslessly coded FEXT data and/or the FEXT cancellation coefficients are stored on the first chip (on-chip) or on a second chip (off-chip).

6. The method of claim 1 wherein each VDSL line in the vectored VDSL line group operates in accordance with a VDSL standard.

7. The method of claim 1 wherein generating quantized FEXT data from the decimated test signal output data by smoothing the decimated test signal output data comprises:
scaling the decimated test signal output data to generate scaled FEXT data; and
rounding the scaled FEXT data to generate the quantized FEXT data to reduce measurement errors and/or to reduce the precision of the decimated test signal output data.

8. The method of claim 1 further comprising each VDSL line in the vectored VDSL line group collecting decimated test signal output data and transmitting the collected decimated test signal output data to the DSLAM.

9. A method for operating a vectored DSL line group comprising a plurality of DSL lines, each DSL line comprising a transmitter coupled to a receiver, the plurality of DSL lines comprising a first DSL line comprising a first transmitter and a first receiver, the method comprising:
transmitting test signals from the first transmitter to the first receiver;
the first receiver receiving test signal output data based on the test signal input data;
the first receiver collecting test signal output data for a subset of DSL tones in each of a plurality of DSL tone microbands, wherein each DSL tone microband contains a plurality of DSL tones in a DSL tone frequency band used for transmitting data from the first transmitter to the first receiver, and further wherein each DSL tone subset is not more than half of the number of DSL tones in each microband;
generating FEXT cancellation data from the collected test signal output data, wherein generating FEXT cancellation data comprises one or more of the following:
reducing the precision of the test signal output data to generate quantized output data;
coding the test signal output data; coding the quantized output data;
transmitting at least one of the following to the first transmitter:
the test signal output data;
the FEXT cancellation data;
generating FEXT cancellation coefficients corresponding to the FEXT cancellation data; and
performing vectored DSL processing for transmissions on the vectored DSL line group based on the generated FEXT cancellation coefficients.

10. The method of claim 9 wherein reducing the precision of the test signal output data to generate quantized output data comprises one or more of the following:
smoothing the test signal output data;
denoising the test signal output data;
removing measurement error from the test signal output data;
reducing the size of the test signal output data to generate a test signal output data approximation;
removing test signal output data components that require large amounts of storage or bandwidth;
applying a linear filter to filter out higher frequency components from the test signal output data;
applying a prediction filter to the test signal output data;
applying differential encoding to the test signal output data;
performing quantization using a step size defined for a given tone frequency or frequency band;
performing mantissa-exponent quantization of the test signal output data;
performing a linear regression using the test signal output data;
performing interpolation using the test signal output data;
applying block complex mantissa-exponent quantization of the test signal output data.

11. The method of claim 10 wherein coding the test signal output data or coding the quantized output data comprises one or more of the following; lossless compression; entropy coding; transform coding; arithmetic coding; Huffman coding; Golomb coding; Golomb-Rice coding.

12. The method of claim 11 further comprising updating the FEXT cancellation data.

13. The method of claim 12 wherein generating FEXT cancellation data from the test signal output data is performed by at least one of the following; a vectoring control entity (VCE) in an upstream-end device; a downstream-end modem; a computer; a DSLAM.

14. The method of claim 12 wherein generating FEXT cancellation data from the test signal output data comprises reducing the precision of the test signal output data to generate quantized output data, then losslessly coding the quantized output data.

15. A method for performing DSL vectoring for a DSL vectored line group comprising a plurality of DSL lines, each DSL line comprising a DSLAM coupled to customer premises equipment (CPE), the plurality of DSL lines comprising a first DSL line comprising a first CPE coupled to the DSLAM, the method comprising:
performing lossy operations to reduce the size of uncompressed far-end crosstalk (FEXT) cancellation coefficients and generate approximated FEXT cancellation coefficients;
performing lossless operations on the approximated FEXT cancellation coefficients to reduce the size of the approximated FEXT cancellation coefficients and to generate a compressed FEXT cancellation coefficients configured as a serial bit stream configured to be stored in a memory buffer.

16. The method of claim 15 wherein the lossy operations comprise:
  decimating the uncompressed far-end crosstalk (FEXT) cancellation coefficients to generate decimated data; and
  quantizing the decimated data to generate the approximated FEXT cancellation coefficients.

17. The method of claim 16 wherein the lossless operations comprise:
  applying a linear predictor to the approximated FEXT cancellation coefficients to generate error sequence data; and
  applying Golomb encoding to the error sequence data to generate the compressed FEXT cancellation coefficients.

18. The method of claim 17 wherein the error sequence data comprises complex numbers and further wherein the Golomb encoding comprises coding the real and imaginary components of each complex number to separate sequences, wherein lengths of Golomb coded sequences are determined by the frequency of occurrence of each complex number part.

19. The method of claim 17 wherein the error sequence data comprises complex numbers and further wherein the Golomb encoding comprises coding both real and imaginary parts of each complex number as a single input symbol, wherein the Golomb encoding further comprises mapping each complex number input symbol to a positive integer in a positive integer set and then assigning codewords to the positive integers in the positive integer set.

* * * * *

UNITED STATES PATENT AND TRADEMARK OFFICE
CERTIFICATE OF CORRECTION

PATENT NO.        : 8,780,686 B2
APPLICATION NO.   : 13/189095
DATED             : July 15, 2014
INVENTOR(S)       : Sands et al.

It is certified that error appears in the above-identified patent and that said Letters Patent is hereby corrected as shown below:

In the Drawings:

In Fig. 15, Sheet 13 of 29, delete "Procesor" and insert -- Processor --, therefor at each occurrence throughout the drawings.

In Fig 24, Sheet 22 of 29, insert main designator --  --.

In Fig. 31, Sheet 28 of 29, Line 6, delete "nargin" and insert -- margin --, therefor.

In the Specification:

In Column 1, Line 17, delete "purposes;" and insert -- purposes. --, therefor.

Signed and Sealed this
Seventh Day of October, 2014

Michelle K. Lee
*Deputy Director of the United States Patent and Trademark Office*